United States Patent
Lin

(10) Patent No.: US 6,205,400 B1
(45) Date of Patent: Mar. 20, 2001

(54) VEHICLE POSITIONING AND DATA INTEGRATING METHOD AND SYSTEM THEREOF

(76) Inventor: Ching-Fang Lin, 9131 Mason Ave., Chatsworth, CA (US) 91311

(*) Notice: Subject to any disclaimer, the term of this patent is extended or adjusted under 35 U.S.C. 154(b) by 0 days.

(21) Appl. No.: 09/374,480

(22) Filed: Aug. 13, 1999

Related U.S. Application Data

(60) Provisional application No. 60/110,124, filed on Nov. 27, 1998.

(51) Int. Cl.[7] .................... G01C 21/00; G01S 23/00
(52) U.S. Cl. .................... 701/214; 701/213; 701/215; 701/216; 701/220; 701/225; 342/357.05; 342/357.06; 342/357.14; 342/457; 342/359; 348/116; 364/428; 364/424.027
(58) Field of Search .................... 701/207, 213, 701/214, 215, 216, 220, 225; 342/357.14, 357.06, 357.05, 359, 457; 348/116; 364/428, 424.027

(56) References Cited

U.S. PATENT DOCUMENTS

| | | | |
|---|---|---|---|
| 5,555,503 | * | 9/1996 | Kyrtsos et al. .................... 364/449 |
| 5,610,815 | * | 3/1997 | Gudat et al. .................... 364/424.027 |
| 5,654,890 | * | 8/1997 | Nicosia et al. .................... 364/428 |
| 5,787,384 | * | 7/1998 | Johnson .................... 701/216 |
| 5,831,570 | * | 11/1998 | Ammar et al. .................... 342/26 |
| 5,894,323 | * | 4/1999 | Kain et al. .................... 348/116 |
| 5,928,309 | * | 7/1999 | Korver et al. .................... 701/214 |
| 6,012,013 | * | 1/2000 | McBurney .................... 701/207 |
| 6,018,698 | * | 1/2000 | Nicosia et al. .................... 701/214 |
| 6,064,336 | * | 5/2000 | Krasner .................... 342/357.05 |
| 6,081,230 | * | 6/2000 | Hoshino et al. .................... 342/357.06 |
| 6,085,148 | * | 7/2000 | Jamison et al. .................... 701/211 |
| 6,088,653 | * | 7/2000 | Sheikh et al. .................... 701/214 |
| 6,122,572 | * | 9/2000 | Yavnai .................... 701/23 |
| 6,127,970 | * | 10/2000 | Lin .................... 342/357.14 |
| 6,134,484 | * | 10/2000 | Geier et al. .................... 701/13 |

* cited by examiner

Primary Examiner—William A. Cuchlinski, Jr.
Assistant Examiner—Ronnie Mancho
(74) Attorney, Agent, or Firm—Raymond Y. Chan; David and Raymond

(57) ABSTRACT

A vehicle positioning and data integrating process and system can substantially solve the problems encountered in avionics system integration, which employs integrated global positioning system/inertial measurement unit enhanced with altitude measurements to derive vehicle position, velocity, attitude, and body acceleration and rotation information. A vehicle positioning and data integrating system comprises navigation sensors and an IMU interface and preprocessing board, an altitude interface and processing board, a navigation processing board, a shared memory card, a bus arbiter, a control board, and a bus interface. The control board distributes navigation data to flight management system, flight control system, automatic dependent aurveillance, cockpit display, enhanced ground proximity warning system, weather radar, and satellite communication system.

38 Claims, 22 Drawing Sheets

VEHICLE POSITIONING AND DATA INTEGRATING METHOD AND SYSTEM THEREOF

CROSS REFERENCE OF RELATED APPLICATION

This is a regular application of a provisional application, application No. 60/110,124, filed on Nov. 27, 1998.

FIELD OF THE PRESENT INVENTION

The present invention relates generally to integrated designing of avionics systems, and more particularly to a universal vehicle positioning and data integrating method, which employs integrated global positioning system/inertial measurement unit enhanced with altitude measurements to derive vehicle position, velocity, attitude, and body acceleration and rotation information, and distributes these data to flight management system, flight control system, automatic dependent aurveillance, cockpit display, enhanced ground proximity warning system, weather radar, and satellite communication system.

BACKGROUND OF THE PRESENT INVENTION

There are commonly difficult problems in the integrated design of avionics systems. Commercial aircraft avionics systems, such as multiple radios, navigation systems, flight management systems, flight control systems, and cockpit display, are ever-increasing in complexity. Each has dedicated controls that require the pilot's attention, particularly during critical flight conditions. Moreover, the task is compounded when the pilot's accessibility to dedicated controls is limited by cockpit space restrictions.

Flight management system (FMS) includes flight navigation management, flight planning, and integrated trajectory generator and guidance law. The FMS of a flight vehicle acts in conjunction with the measurement systems and onboard inertial reference systems to navigate the vehicle along trajectory and off trajectory for enroute, terminal, and approach operations. Nowadays, advanced flight vehicles are equipped with flight management computers which calculate trajectories and with integrated control system which fly the vehicle along these trajectories, thus minimizing direct operating cost.

The guidance function is carried out using the FMS. In some applications, the cruise control law and some automatic trajectory tracking control laws (especially for four-dimensional control and lateral turns) are also included in the FMS. In this way, they are closely coupled with the guidance functions. In the approaching and landing phase, the optimal position of the vehicle is captured by the FMS through the calculation of the trajectory. Precise guidance and control are required because the cross-track error and the relative position deviation are sensitive to the accuracy of guidance. Hence, the accuracy of the guidance function in the FMS greatly determines the vehicle performance of approaching and landing as well as other critical mission segments. However, the automatic flight control system (FCS), not the FMS, should include critical functions for both operational and failure considerations because critical functions such as those of high band pass inner-loops are normally handled by an automatic FCS. Therefore, it is desired to avoid incorporating these functions in the FMS even though they can be handled with separate processors in the FMS.

Assuming that the fast control loop is 100 Hz and the slow control loop is 50 Hz, the selection of 50 Hz as the major frame updates the major frame every 20 ms. The sensor input is at 200 Hz. If it is chosen as a minor frame, then the minor frame is 5 ms. Other subsystems at 50 Hz are the guidance command, the FCS data input, the FCS data output, and the actuation/servo command. At each major frame, the sensor inputs are updated four times and the fast control loops are computed twice. The slow control loop, the guidance command, the FCS data input, the FCS data output, and the actuation/servo command are updated once.

The increasing complexity of the flight management systems and flight control systems, as well as other avionics systems, requires the integrated design of avionics or integrated avionics systems. For instance, it is anticipated that the new generation of commercial aircraft will use integrated modular avionics, which will become an integral part of the avionics architecture for these aircraft. The integrated modular avionics suite will enable the integrated avionics to share such functions as processing, input/output, memory, and power supply generation. The flight decks of these new generation of airliners will incorporate advanced features such as flat-panel screens instead of cathode-ray tubes (CRTs), which will display flight, navigation, and engine information.

Advances in inertial sensors, displays, and VLSI/VHSIC (Very Large Scale Integration/Very High Speed Integrated Chip) technologies made possible the use of navigation systems to be designed for commercial aviation aircraft to use all-digital inertial reference systems (IRS). The IRS interfaces with a typical transport aircraft flight management system. The primary outputs from the system are linear accelerations, angular rates, pitch/roll attitude, and north-east-vertical velocity data used for inputs to a transport flight control system.

An inertial navigation system comprises an onboard inertial measurement unit, a processor, and an embedded navigation software. The positioning solution is obtained by numerically solving Newton's equations of motion using measurements of vehicle specific forces and rotation rates obtained from onboard inertial sensors. The onboard inertial sensors consist of accelerometers and gyros which together with the associated hardware and electronics comprise the inertial measurement unit.

The inertial navigation system may be mechanized in either a gimbaled or strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Possible navigation frames include earth centered inertial (ECI), earth-centered-earth-fix (ECEF), locally level with axes in the directions of north, east, down (NED), and locally level with a wander azimuth. In a strapdown inertial navigation system, the inertial sensors are rigidly mounted to the vehicle body frame, and a coordinate frame transformation matrix (analyzing platform) is used to transform the body-expressed acceleration and rotation measurements to a navigation frame to perform the navigation computation in the stabilized navigation frame. Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems are becoming the predominant mechanization due to their low cost and reliability.

Inertial navigation systems in principle permit pure autonomous operation and output continuous position, velocity, and attitude data of vehicle after initializing the starting position and initiating an alignment procedure. In addition to autonomous operation, other advantages of inertial navigation system include the full navigation solution and wide bandwidth. However, an inertial navigation system is expensive and subject to drift over an extended period of time. It means that the position error increases with time. This error propagation characteristic is primarily caused by its inertial sensor error sources, such as gyro drift, accelerometer bias, and scale factor errors.

SUMMARY OF THE PRESENT INVENTION

It is a main objective of the present invention to provide a universal vehicle positioning and data integrating method and system thereof, in which a control board manages and distributes the navigation data and inertial sensor data to relative onboard avionics systems.

Another objective of the present invention is to provide a universal vehicle positioning and data integrating method and system thereof, in which the flight management system gets vehicle position, velocity, attitude, and time data from a global positioning system/inertial measurement unit integrated navigation system enhanced by an altitude measurement unit to perform flight management operations.

Another objective of the present invention to provide a universal vehicle positioning and data integrating method and system thereof, in which the flight control system gets vehicle attitude and velocity, and vehicle body acceleration and rotation data from a global positioning system/inertial measurement unit integrated navigation system enhanced by an altitude measurement unit to perform vehicle flight control.

Another objective of the present invention to provide a universal vehicle positioning and data integrating method and system thereof, in which the automatic dependent surveillance system gets vehicle position and time data from a global positioning system/inertial measurement unit integrated navigation system enhanced by an altitude measurement unit to report vehicle's position.

Another objective of the present invention to provide a universal vehicle positioning and data integrating method and system thereof, in which the cockpit display gets vehicle position, attitude, heading, velocity, and time data from a global positioning system/inertial measurement unit integrated navigation system enhanced by an altitude measurement unit to display navigation information.

Another objective of the present invention to provide a universal vehicle positioning and data integrating method and system thereof, in which the enhanced ground proximity warning system gets vehicle position, velocity, and attitude data from a global positioning system/inertial measurement unit integrated navigation system enhanced by an altitude measurement unit to query terrain data, and to predict the transportation path.

Another objective of the present invention to provide a universal vehicle positioning and data integrating method and system thereof, in which the weather radar gets platform attitude and body acceleration data from a global positioning system/inertial measurement unit integrated navigation system enhanced by an altitude measurement unit to stabilize the weather radar antenna.

Another objective of the present invention to provide a universal vehicle positioning and data integrating method and system thereof, in which the satellite communication system gets vehicle position and attitude data from a global positioning system/inertial measurement unit integrated navigation system enhanced by an altitude measurement unit to point the communication antenna to the satellite.

The present invention can substantially solve the problems encountered in avionics system integration by using state-of-the-art inertial sensor, global positioning system technology, integrated global positioning system/inertial measurement unit enhanced with altitude measurements, and advanced bus and computing technologies. The present invention is to balance multiple requirements imposed on the modern avionics systems design and manufacturing: low cost, high accuracy, reliability, small size and weight, low power consumption, ease of operation and maintenance, and ease of modification.

DETAILED DESCRIPTION OF THE PREFERRED EMBODIMENT

Figure 1:
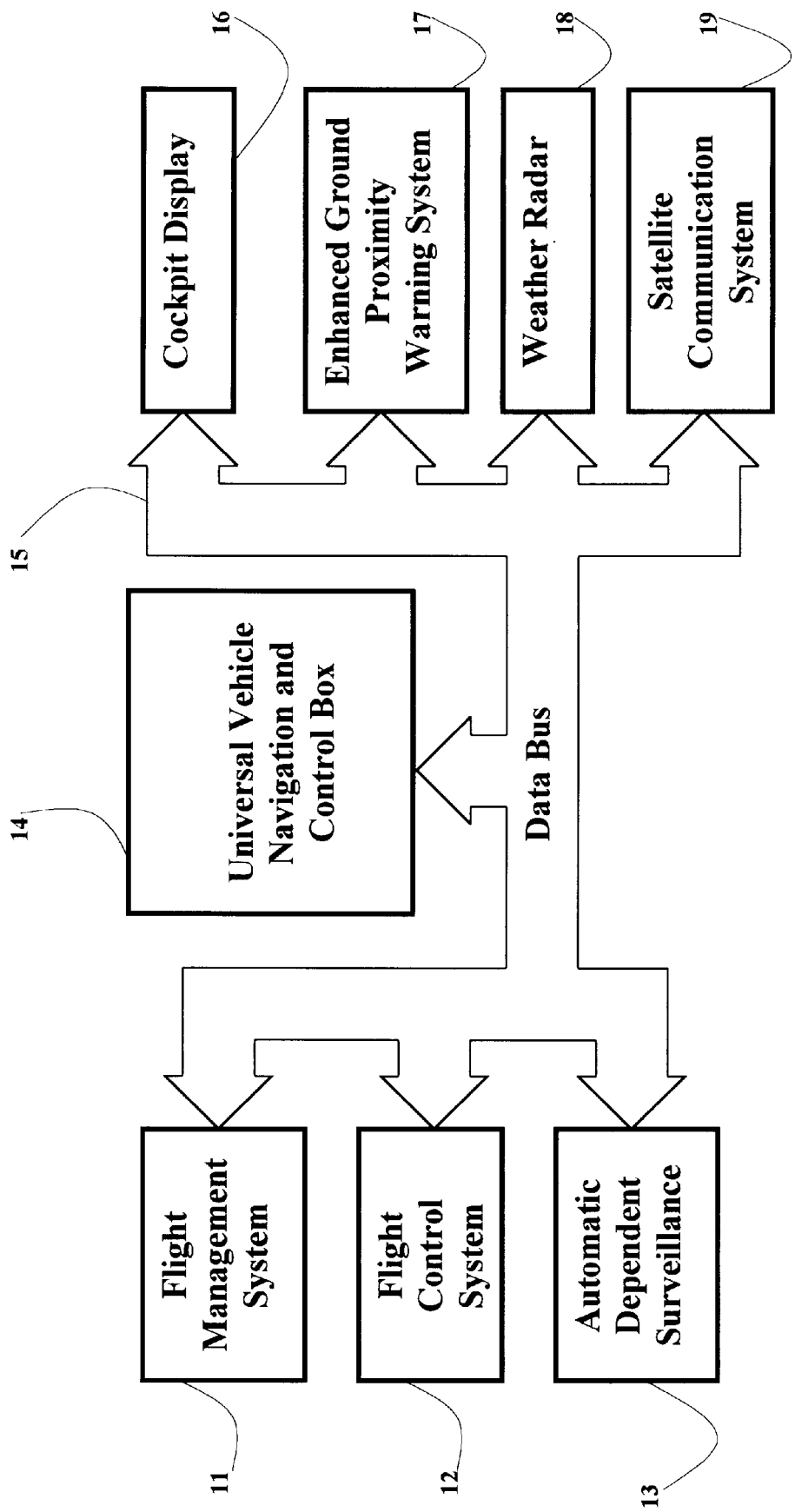
FIG. 1 is a block diagram illustrating a universal vehicle navigation and control box equipped with a flight management system, a flight control system, an automatic dependent surveillance, a cockpit display, an enhanced ground proximity warning system, a weather radar, and a satellite communication system, according to the present invention.

Generally, the accuracy of inertial navigation systems (INS) can be improved by employing highly accurate inertial sensors or by compensating with data from an external sensor. The cost of developing and manufacturing inertial sensors increases as the level of accuracy improves. The advances in new inertial sensor technology and electronic technologies have led to the availability of low cost inertial sensors, such as mechnical-electronic-micro-system (MEMS) inertial sensors. Mechanical-electronic-microsystem inertial sensors borrow processes from the semiconductor industry to fabricate tiny sensors and actuators on silicon chips. The precision of these new inertial sensors may be less than what conventional sensors achieve, but they have enormous cost, size, weight, thermal stability and wide dynamic range advantages over conventional inertial sensors.

The present invention employs an integrated global positioning system/inertial measurement unit coupled with an altitude measurement unit to provide highly accurate and continuous positioning of a vehicle, high accurate attitude determination, and platform body acceleration and rotation data, as well as time data output. These data are managed and dispensed by a control board. The advantages of the present invention includes:

(1) The inertial navigation system has high accurate short term positioning capability, but subjects to long term drift which leads to bad long term navigation solution. The global positioning system (GPS) has long term high accurate navigation performance. Through integration of these two disparate systems, it is expected to obtain high accurate long term and short term navigation solution.

(2) The integrated global positioning system/inertial measurement unit is coupled with an altitude measurement unit, such as a barometer device, or a radar altimeter to improve the vertical positioning accuracy.

(3) The velocity and acceleration obtained from an inertial measurement unit (IMU) are fed back to the global positioning system processor to aid the carrier phase and code tracking of the global positioning system satellite signals, so as to enhance the performance of the global positioning and inertial integration system, especially in heavy jamming and high dynamic environments.

(4) The high accurate navigation solution from an integrated global positioning system/inertial measurement unit coupled with altitude measurement is used to aid the global positioning system carrier phase ambiguity resolution. By this way, the carrier phase data extracted from a global positioning system processor can be blended in a kalman filter to further improve the navigation solution.

(5) The gyros and accelerometers provide platform body rotation and acceleration information which are essential data required by a flight control system. These data are distributed to the flight control system as well as the platform velocity and attitude information. By this way, the flight control system does not need additional gyros and accelerometers.

(6) The onboard flight management system obtains vehicle position, velocity, attitude, and time data directly from the control board of a universal vehicle navigation and control box, so that it does not need an additional navigation aid.

(7) The onboard automatic dependent surveillance obtains vehicle position and time data directly from the control board of a universal vehicle navigation and control box, so that it does not need an additional navigation aid and a time clock.

(8) The universal vehicle navigation and control box provides vehicle position, velocity, and attitude data and distributes these data to the enhanced ground proximity warning system to advance its function and performance. By this way, the onboard enhanced ground proximity warning system does not require an additional navigation aid to provide vehicle position, velocity and attitude information.

(9) The body acceleration data obtained from accelerometer assembly in an IMU is distributed by the control board of a universal navigation and control box to the weather radar as well as the platform attitude information. These data are used to stabilize the weather radar antenna system, so that additional accelerometers and attitude sensors are saved.

(10) The platform position and attitude are distributed by the control board of a universal navigation and control box to the satellite communication system. These data are used to point the communication antenna system to the communication satellites, so that additional positioning system and attitude sensors are saved.

Referring to FIG. 1, a universal vehicle navigation and control box 14 is connected to a data bus 15. The data bus 15 is a standard bus, such as MIL 553B bus, ARINC 429 bus, ARINC 629 bus. A flight management system 11, a flight control system 12, an automatic dependent surveillance 13, a cockpit display 16, an enhanced ground proximity warning system 17, a weather radar 18, and a satellite communication system 19 are also connected to the data bus 15. The data bus 15 is responsible of transferring data between the universal vehicle navigation and control box 14, the flight management system 11, the flight control system 12, the automatic dependent surveillance 13, the cockpit display 16, the enhanced ground proximity warning system 17, the weather radar 18, and a satellite communication system 19.

Figure 2:
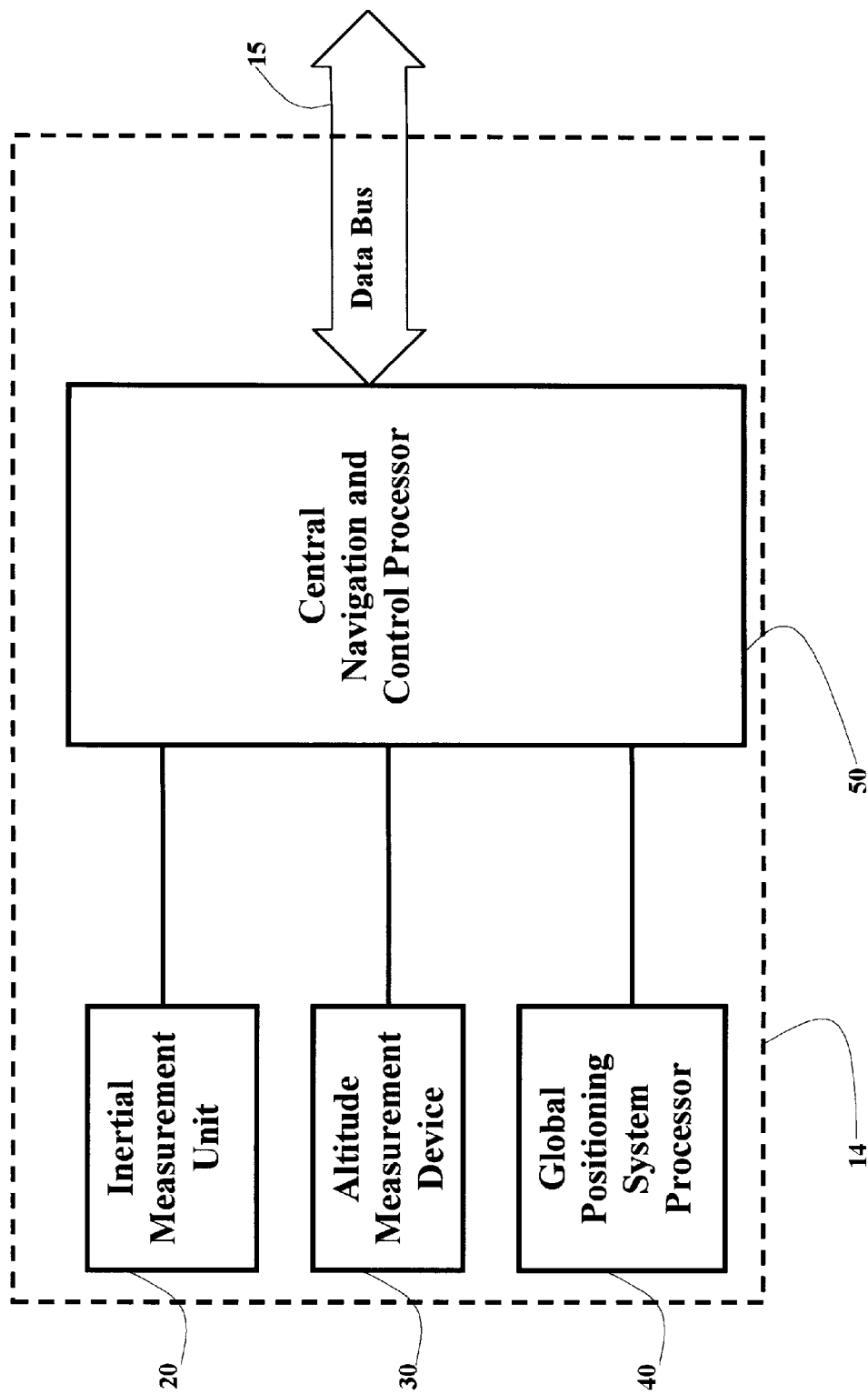
FIG. 2 is a block diagram of a universal vehicle navigation and control box according to the present invention.

Referring to FIG. 2, the universal vehicle navigation and control box 14 comprises an inertial measurement unit 20, an altitude measurement device 30, and a global positioning system processor 40 which are connected to a central navigation and control processor 50 respectively. The central navigation and control processor 50 is connected to the data bus 15.

Figure 3:
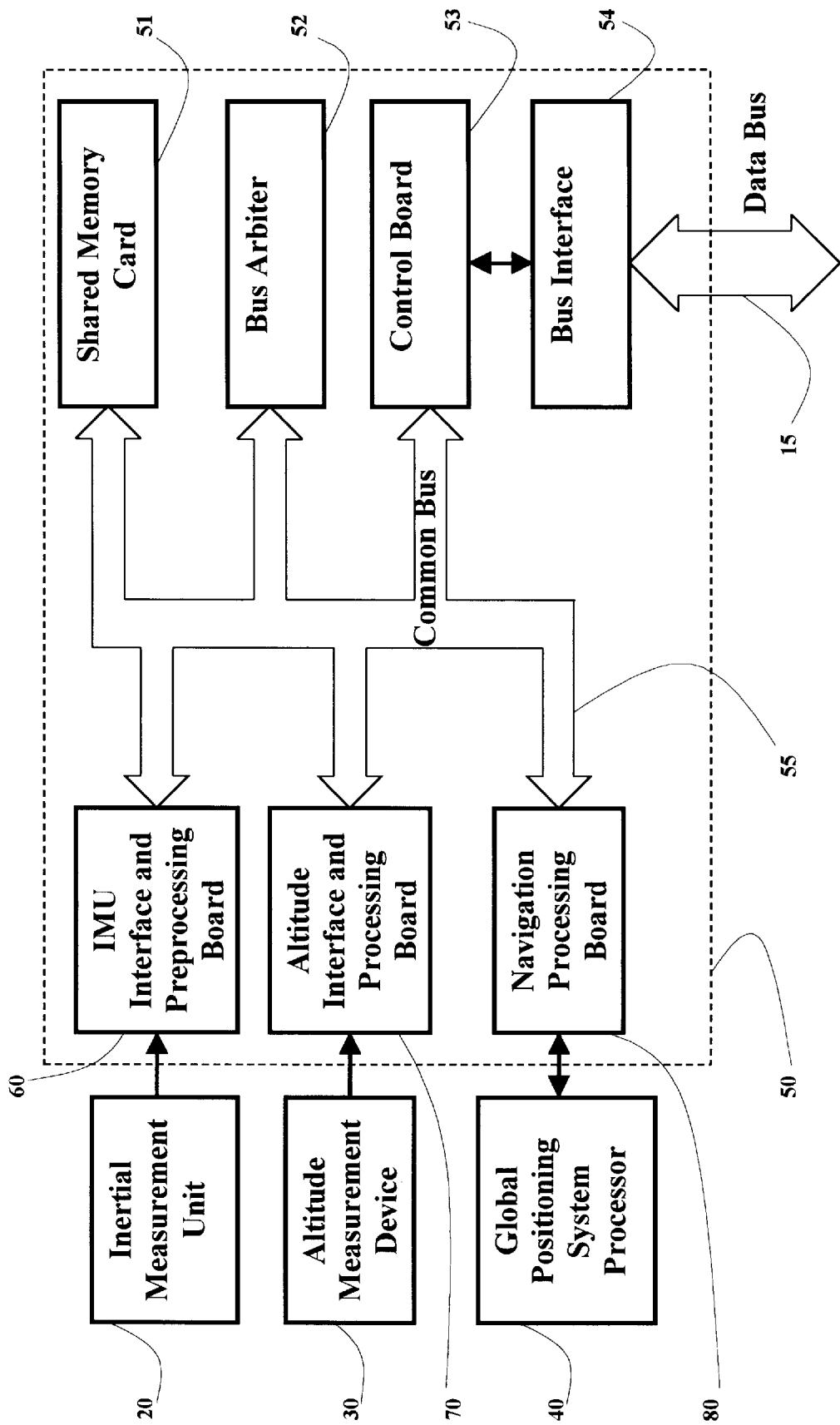
FIG. 3 is a block diagram illustrating the configuration of a universal vehicle navigation and control box according to the present invention.

Referring to FIG. 3, the central navigation and control processor 50 comprises an IMU interface and preprocessing board 60, an altitude interface and preprocessing board 70, a navigation processing board 80, a shared memory card 51, a bus arbiter 52, and a control board 53 which are mutually connected through a common bus 55. The central navigation and control processor 50 further comprises a bus interface 54 which provides connection between the control board 53 and the data bus 15.

Referring to FIGS. 1, 2, 3, 4, 5a, 6a, 7, 8, 9, 10, 11, 12, 13, 16, 17, and 18, a first preferred embodiment of the present invention is illustrated, which comprises the steps as follows:

1) Perform GPS processing and receive GPS measurements, including pseudorange, carrier phase, Doppler shift, and time from the global positioning system processor 40, and pass them to the navigation processing board 80 of the central navigation processor 50.

2) Receive inertial measurements including body angular rates and specific forces, from the inertial measurement unit 20, convert them into digital data of body acceleration and rotation by the IMU interface and preprocessing board 60, and send them to the navigation processing board 80 and the control board 53 via the common bus 55.

3) Receive an altitude measurement from the altitude measurement device 30, convert it to mean sea level (MSL) height in digital data type by the altitude interface and processing board 70, and pass it to the navigation processing board 80 and the control board 53 through the common bus 55.

4) Perform inertial navigation system (INS) processing using an INS processor 81.

5) Blend the output of the INS processor 81, the altitude measurement, and the GPS measurements in a kalman filter 83.

6) Feed back the output of the kalman filter 83 to the INS processor 81 to correct the INS navigation solution.

7) Inject velocity and acceleration data from the INS processor 81 into a signal processor 45 of the global positioning system processor 40 to aid the code and carrier phase tracking of the global positioning system satellite signals.

8) Inject the output of the signal processor 45 of the global positioning system processor 40, the output of the INS processor 81, the output of the kalman filter 83 into a carrier phase integer ambiguity resolution module 82 to fix the global positioning system satellite signal carrier phase integer ambiguity number.

9) Output the carrier phase integer number from the carrier phase integer ambiguity resolution module 82 into the kalman filter 83 to further improve the positioning accuracy.

10) Output the navigation data which are platform velocity, position, altitude, heading and time from the INS processor 81 to the control board 53 through the common bus 55.

11) Send the platform position, velocity, attitude, heading, and time data to the flight management system 11.

12) Send the platform velocity, attitude, body acceleration and rotation data to the flight control system 12.

13) Send the platform position and time data to the automatic dependent surveillance 13.

14) Send the platform position, velocity, and attitude data to the enhanced ground proximity warning system 17.

15) Send the platform attitude and body acceleration data to the weather radar 18.

16) Send the platform position and attitude data to the satellite communication system 19.

In step (1), the GPS satellites transmit the coarse acquisition (C/A) code and precision (P) code on radio frequency (RF) at L1 band:

$$S_{l1}(t)=\sqrt{2P_c}CA(t)D(t)\cos(\omega_1 t+\phi)+\sqrt{2P_p}P(t)D(t)\sin(\omega_1 t+\phi)$$

The GPS satellites transmit the precision (P) code on radio frequency (RF) at L2 band:

$$S_{l2}(t)=\sqrt{2P_2}P(t)D(t)\cos(\omega_2 t+\phi_2)$$

where, $\omega_1$ is the L1 radian carrier frequency, $\phi$ is a small phase noise and oscillator drift component, $P_c$ is the C/A signal power, $P_p$ is the P signal power, $D(t)$ is the navigation data, $CA(t)$ is the C/A code, $P(t)$ is the P code, $\omega_2$ is the L2 radian carrier frequency, $P_2$ is the L2-P signal power, $\phi_2$ is a small phase noise and oscillator drift component.

Figure 5A:
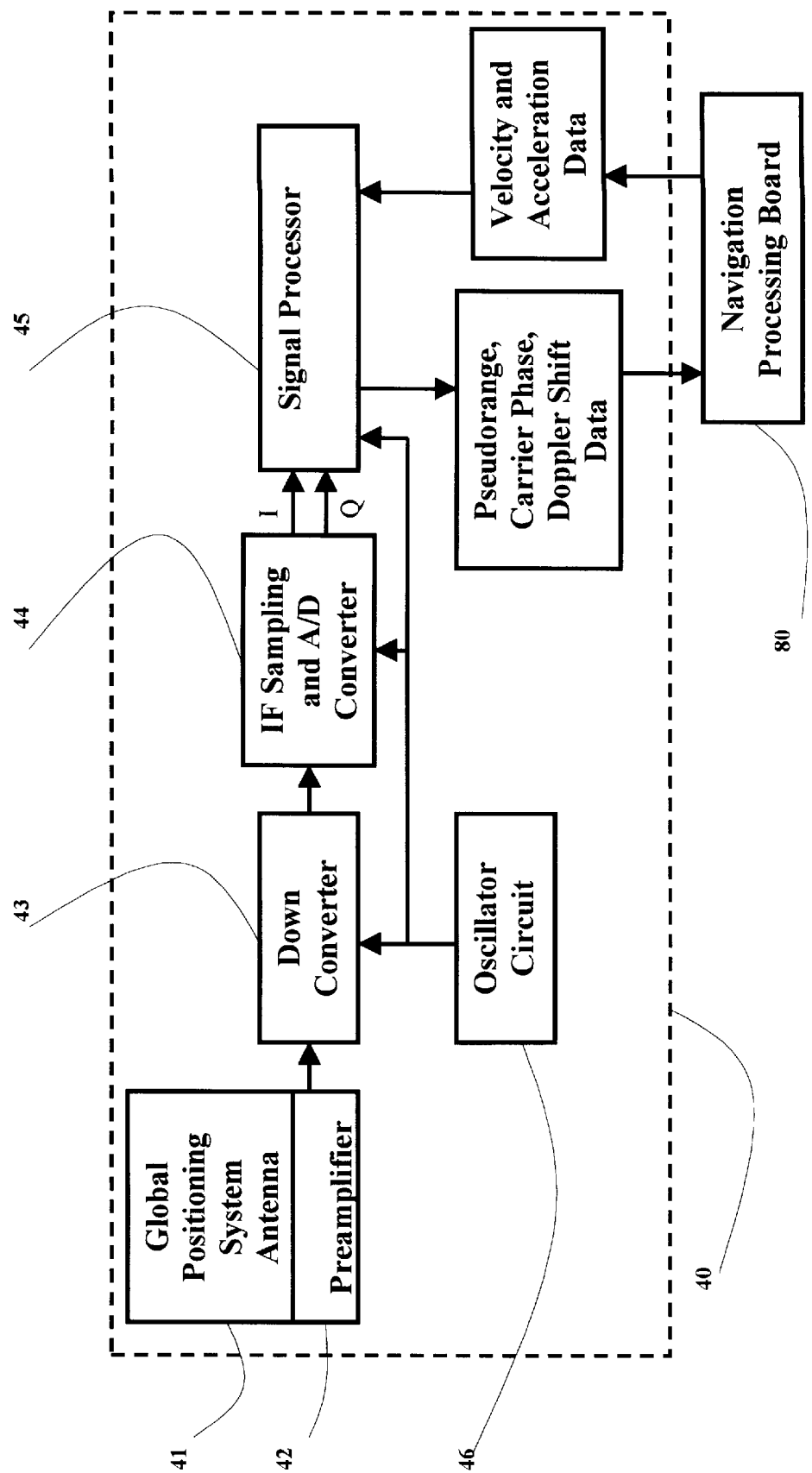
FIG. 5a is a block diagram of the global positioning system processor with external aiding from the navigation processing board according to a first preferred embodiment of the present invention.

In step (1), as shown in FIG. 5a, the received RF signals at the global positioning system antenna 41 are, respectively:

$$S_{l1}(t)=\sqrt{2P_c}CA(t-\tau)D(t)\cos[(\omega_1+\omega_d)t+\phi]+\sqrt{2P_p}P(t)D(t)\sin[(\omega_1+\omega_d)t+\phi)]$$

$$S_{l2}(t)=\sqrt{2P_2}P(t-\tau)D(t)\cos[(\omega_2+\omega_d)t+\phi_2)]$$

where, $\tau$ is the code delay, $\omega_d$ is the Doppler radian frequency.

In step (1), as shown in FIG. 5a, the received GPS RF signals are amplified by a preamplifier circuit 42. The amplified GPS RF signals are then passed to a down converter 43 of the global positioning system processor 40. The down converter 43 converts the amplified radio frequency (RF) signal to intermediate frequency (IF) signal. The IF signal is processed by an IF sampling and A/D converter 44 to convert the IF signal to that of in-phase (I) and quadraphase (Q) components of the signal envelope. In the IF sampling and A/D converter 44, the IF signal which is analog signal, is first filtered by a low pass filter, and then sampled, finally converted from the analog signal to digital data (A/D). The digital data are input into a signal processor 45 to extract the navigation data modulated on the GPS signal, such as the GPS satellite ephemeris, atmosphere parameters, satellite clock parameter, and time information. The signal processor 45 also processes the digital data from the IF sampling and A/D converter 34 to derive the pseudorange, carrier phase, and Doppler frequency shift. In global positioning system processor 40, an oscillator circuit 46 provides the clock signal to the down converter 43, the IF sampling and A/D converter 44, and the signal processor 45.

Referring to FIG. 5a, in step (1), the signal processor 45 outputs the GPS measurements, including pseudorange, carrier phase, and Doppler shift, and the time data to the navigation processing board 80. In step (7), the signal processor 45 receives the velocity and acceleration information from the navigation processing board 80 to perform external velocity-acceleration aiding code and carrier phase tracking.

Figure 6A:
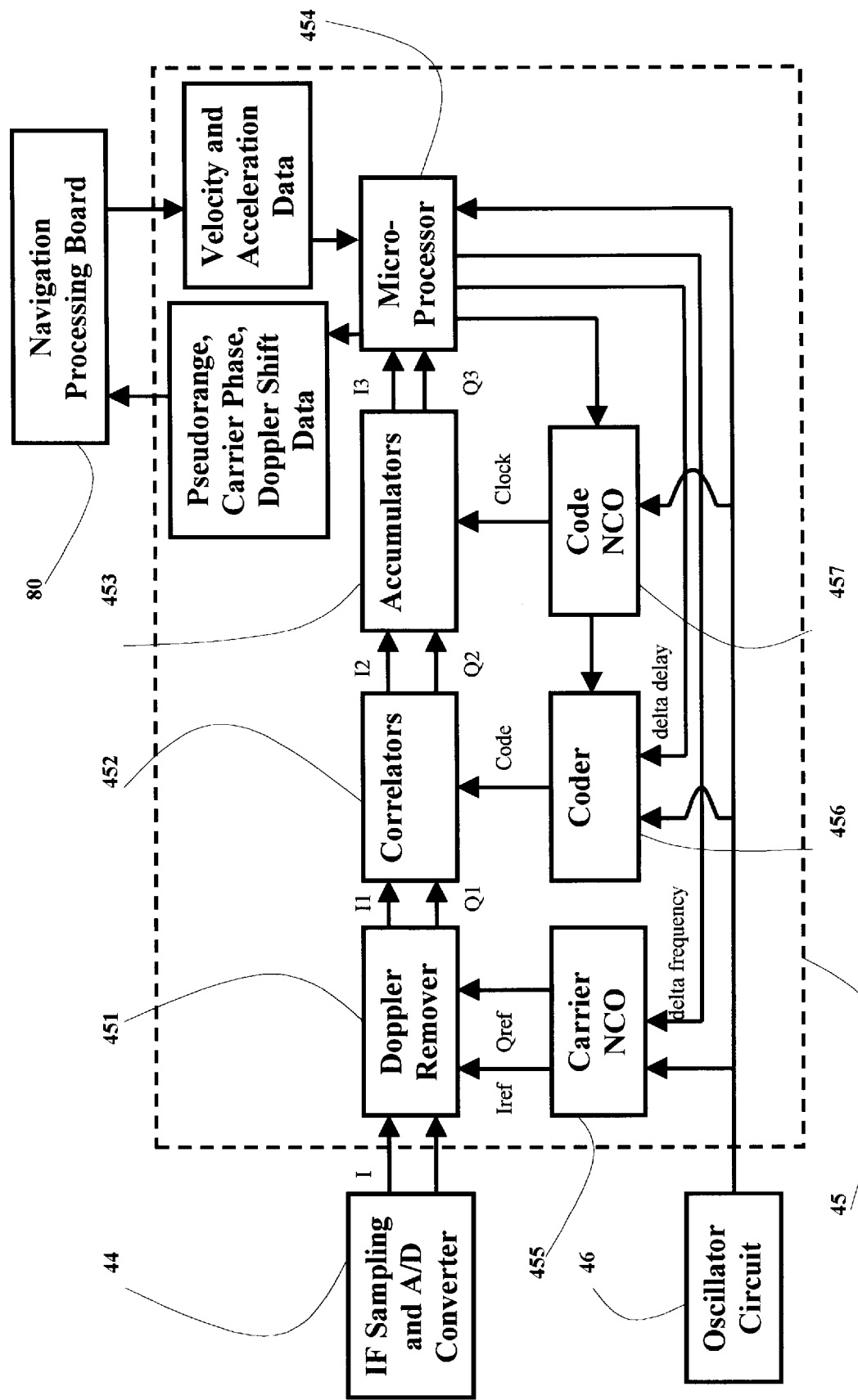
FIG. 6a is a block diagram of the signal processor of the global positioning system processor with external aiding from the navigation processing board according to the first preferred embodiment of the present invention.

Referring to FIG. 6a, in step (1) the pseudorange measurements are derived from the GPS code tracking loop which comprises a correlators 452, an accumulators 453, a micro-processor 454, a code NCO (numerical controlled oscillator) 457, and a coder 456. The Doppler shift and carrier phase measurements are obtained from the GPS satellite signal carrier phase tracking loop which comprises a Doppler removal 451, correlators 452, accumulators 453, a micro-processor 454, and a carrier NCO (numerical controlled oscillator) 455.

Referring to FIG. 6a, in step (1), the digital data (I and Q) from the IF sampling and A/D converter 44 are processed by a Doppler remover 451 to remove the Doppler shift modulated on the GPS satellite signal. The Doppler remover 451 is used by the carrier tracking loop to track the phase and frequency of the incoming signal. The Doppler removal is accomplished with a digital implementation of a single sideband modulator. The carrier NCO (numerical controlled oscillator) 455 accumulates phase at its clocking rate based upon a frequency number input. Every time when its accumulator rolls over, a new cycle is generated. The time that it takes to do is a cycle period. The clock from the oscillator circuit 46 and the delta frequency from the micro-processor 454 drive the carrier NCO 455. The carrier NCO 455 outputs in-phase and quadraphase components of reference phase (Iref and Qref). The reference phase is output to the Doppler remover 451.

Referring to FIG. 6a, in step (1), the GPS satellite signal after Doppler removal processing is passed to a correlators 452 in which the correlation process is performed. The accumulators 453 follows the correlators 452 which makes up the postcorrelation processing and filters the correlated signal components (I2 and Q2) prior to processing in the microprocessor. The accumulation process is simply the accumulation of the correlated samples over T seconds, where T is usually a CIA code epoch periods of one ms. The accumulations (I3 and Q3) are stored and collected by the microprocessor 454, and the accumulators 453 are dumped, resulting in an accumulated-an-dump filtering of the signal components.

Referring to FIG. 6a, in step (1), the code used in the correlators 452 comes from a coder 456 which is driven by the clock from the oscillator 46 and the delta delay from the microprocessor 454. The coder 456 is responsible for generation of C/A code and/or P code. The accumulators 453 is driven by the clock generated from a code NCO 457 which is driven by the oscillator 46 and microprocessor 454. The code NCO 457 also drives the coder 456.

Referring to FIG. 6a, in step (7), the microprocessor 454 receives data from the accumulators 453 and the velocity and acceleration data from the navigation processing board 80 to perform loop filtering acquisition processing, lock detection, data recovery, and measurement processing. This working mode is referred to as velocity-acceleration aiding carrier phase and code tracking. In step (1), the microprocessor 454 outputs the GPS measurements, including pseudorange, carrier phase, and Doppler shift, as well as time information to the navigation processing board 80.

Referring to FIG. 6a, in step (1), when the tracking error of GPS signal in the signal tracking loop of the signal processor 45 is larger than the tracking bandwidth of the signal tracking loop, the loss of GPS satellite signal occurs. A loss of lock status of the tracking loop is mainly caused by the low signal-noise ratio (SNR) and Doppler drift of the received satellite signals. The former may be generated by inputting noise or jamming. The latter, Doppler drift, is caused by high-speed movement of the vehicle. Generally, the expansion of the bandwidth of the tracking loop can improve the Phase-Locked Loop (PLL) tracking capability in a high dynamic environment but can simultaneously can corrupt anti-interference capability of the GPS receiving set because more unwanted noise signals are allowed to enter the GPS signal tracking loops. The aiding of GPS signals with corrected INS (inertial navigation system) solution is to obtain an optimal trade-off between GPS tracking loop bandwidth and anti-jamming capabilities.

Referring to FIG. 6a, in step (7) the purpose of the corrected INS velocity-acceleration information aided GPS PLL loop is to estimate the carrier phase of the intermediate frequency signal $\theta_I(t)$ rapidly and accurately over a sufficiently short estimation period, and $\theta_I(t)$ is approximated by $$\theta_I(t) = \theta_{I0} + \omega_{I0} t + \gamma_{I0} t^2 + \delta_{I0} t^3 + \ldots$$

The problem herein becomes to estimate the parameters of the above equation. The velocity-acceleration information, which describes the flight vehicle dynamic characteristics, is translated into the line-of-sight (LOS) velocity-acceleration information. Therefore, the estimate of the carrier phase of the intermediate frequency signal can be formulated by LOS velocity-acceleration values as follows:

$$\hat{\theta}(t) = b_1 V^{LOS} t + b_2 A^{LOS} t^2 + b_3 a^{LOS} t^3 + \Lambda$$

where ($b_1$, $b_2$, $b_3$) are constants related to the carrier frequency and the speed of light, and are given by $$b_1 = \frac{4\pi f_c}{c}, \quad b_2 = \frac{2\pi f_c}{c}, \quad b_3 = \frac{4\pi f_c}{3c}$$

$V^{LOS}$, $A^{LOS}$ and $a^{LOS}$ correspond to the range rate, the range acceleration and the range acceleration rate along the LOS between the satellites and the receiver. Therefore, the tracking and anti-interference capabilities of the aided PLL loop seriously depend on the accuracy of $V^{LOS}$ and $A^{LOS}$ estimation. The $V^{LOS}$ and $A^{LOS}$ can be calculated from the information of velocity and acceleration coming from the INS processor 81 and then be incorporated into the loop filter in the microprocessor 454.

Referring to FIG. 6a, in step (1), the code tracking loop of the signal processor 45 tracks the code phase of the incoming direct sequence spread-spectrum signal. The code tracking loop provides an estimate of the magnitude of time shift required to maximize the correlation between the incoming signal and the internally generated punctual code. This information of time delay is used by the microprocessor 454 to calculate an initial vehicle-to-satellite range estimate, known as the pseudorange. In step (7), the information of velocity and acceleration coming from the navigation processing board 80 is transformed into the LOS velocity and acceleration ($V^{LOS}$ and $A^{LOS}$) which are used to precisely estimate the code delay. By this way, the dynamic performance and anti-jamming capability are enhanced.

The IMU interface and preprocessing board 60 includes an analog signal interface 61, a serial signal interface 62, a pulse signal interface 63, and/or a parallel digital signal interface 64, which are installed between the inertial measurement unit 20 and the common bus 55. They are used to convert the IMU signal obtained from the inertial measurement unit 20 into digital data of body acceleration and rotation, and then to pass the converted digital data to the navigation processing board 80 and the control board 53 via the common bus 55.

Figure 7:
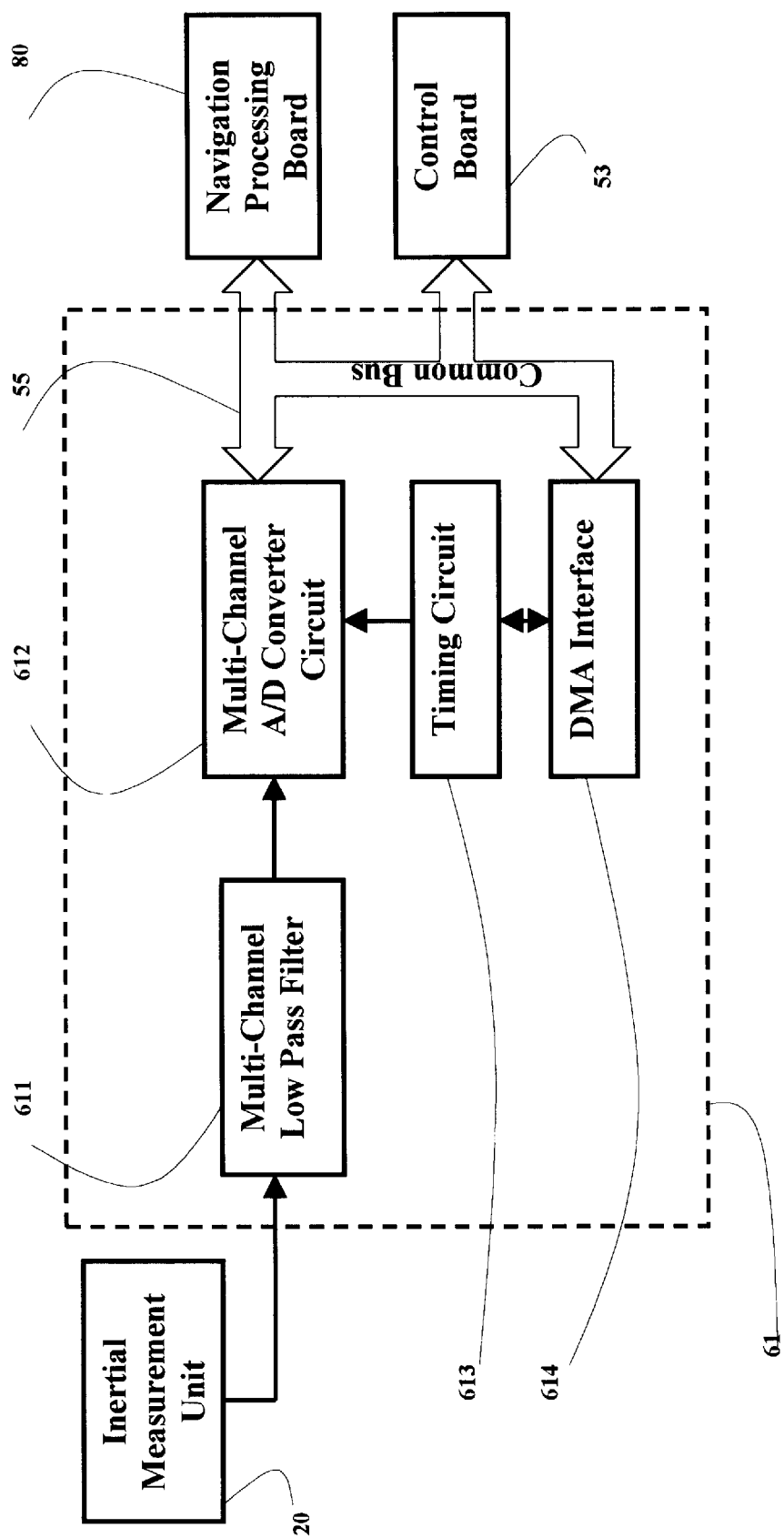
FIG. 7 is a block diagram of an analog signal interface according to the present invention.

In many applications, the outputs of the IMU are analog signals, especially for low performance IMUs, which are often used with a GPS receiver to form an integrated system. As shown in FIG. 7, the analog signal interface 61 is a multi-channel A/D converter circuit board for converting analog IMU signals into digital data, which comprises a multi-channel low pass filter 611 connected to the inertial measurement unit 20, a multi-channel A/D converter circuit 612 connected between the multi-channel low pass filter 611 and the common bus 55, and a DMA interface 614 connected to the common bus 55. The analog interface 61 further comprises a timing circuit 613 connected between the multi-channel A/D converter circuit 612 and the DMA interface 614.

Referring to FIG. 7, in step (2), the analog IMU signals from the inertial measurement unit 20 are filtered by the multi-channel low pass filter 611. The filtered analog IMU signals are sent to the multi-channel A/D converter circuit 612. The timing circuit provides sampling frequency for the multi-channel A/D converter circuit 612. The multi-channel A/D converter circuit 612 samples and digitizes the filtered analog IMU signals. Timing circuit 613 also triggers the DMA interface 614. After sampling and digitizing operation of the multi-channel A/D converter circuit 612, the DMA interface informs the navigation processing board 80 and the control board 53 via the common bus 55 to get IMU data on the common bus 55. After receiving of the DMA signal by the navigation processing board 80 and the control board 53, the multi-channel A/D converter circuit 612 outputs the digitized IMU data on the common bus 55.

Figure 8:
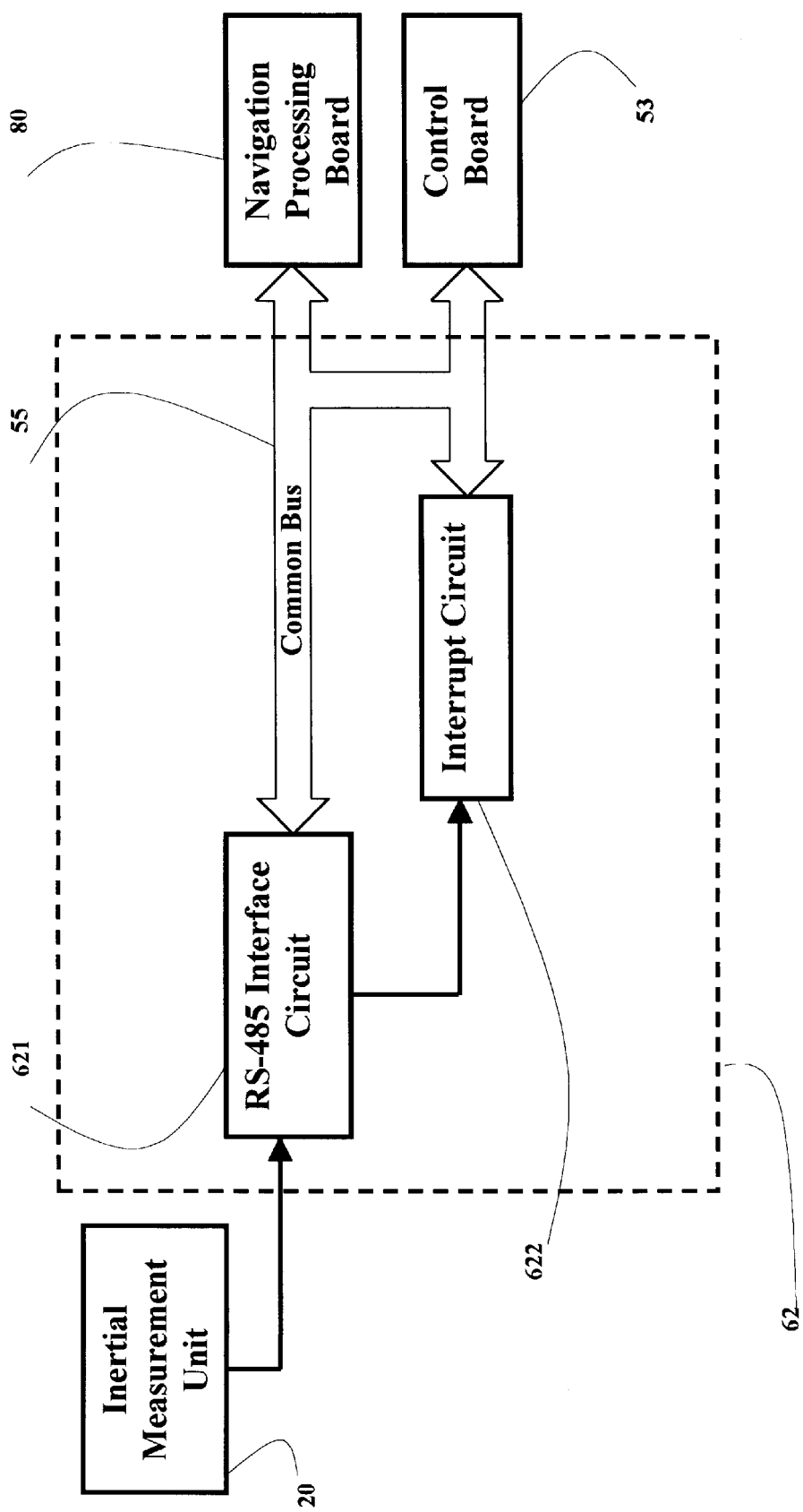
FIG. 8 is a block diagram of a serial signal interface according to the present invention.

Since most IMU manufacturers trend to embed a high performance microprocessor into the IMU to form a so-called "smart" IMU, in which the IMU output signals are sent out by the microprocessor through a standard serial bus, for example, RS-422/485, 1533 bus, etc., as shown in FIG. 8, the serial signal interface 62 is a multi-channel RS-485 communication control circuit board for receiving serial IMU data, which comprises an RS-485 interface circuit 621 connected between the inertial measurement unit 20 and the common bus 55, and an interrupt circuit 622 connected between the RS-485 interface circuit 621 and the common bus 55.

Referring to FIG. 8, in step (2), the RS485 interface circuit 621 receives the serial MU signal from the inertial measurement unit 20. Once the receiving operation is finished, the RS-485 interface circuit informs the interrupt circuit 622. The interrupt circuit then tells the navigation processing board 80 and the control board 53 via the common bus 55 that the IMU data is ready. After receiving interrupt signal from the interrupt interface 622 by the navigation processing board 80 and the control board 53 via the common bus 55, the RS485 interface circuit outputs the IMU data on the common bus 55. The navigation processing board 80 and the control board 53 get the IMU data which are body rates and accelerations from the common bus 55.

Figure 9:
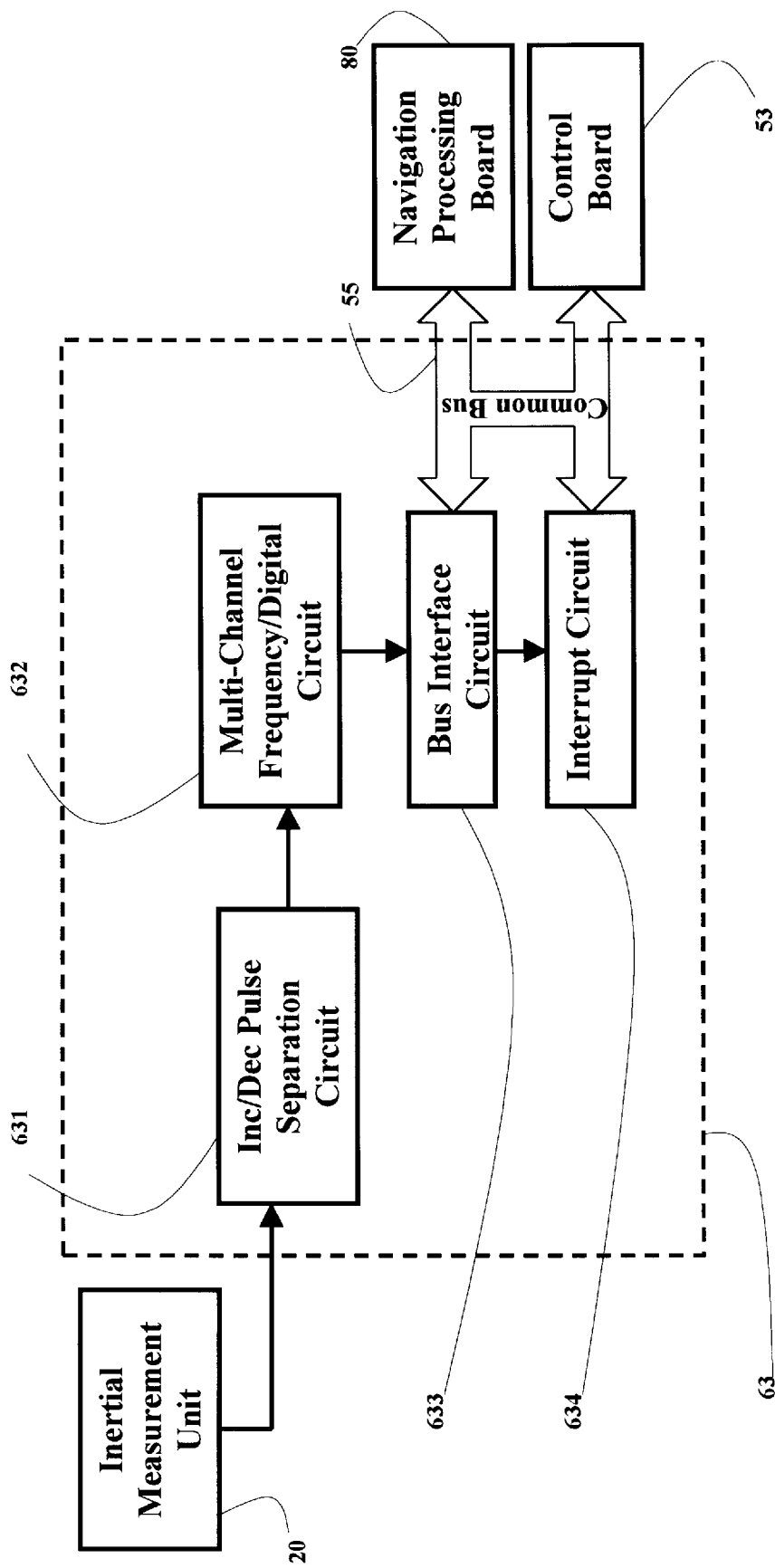
FIG. 9 is a block diagram of a pulse signal interface according to the present invention.

Due to the fact that most high performance gyros and accelerometers provide pulse outputs, RLG and FOG are inherently digital sensors, and many high performance electromechanical gyros and accelerometers have a pulse modulated force rebalance loop. As shown in FIG. 9, the pulse signal interface 63 is a multi-channel frequency/digital converter circuit board 63 for receiving pulse IMU signals, which comprises an Inc/Dec pulse separation circuit 631 connected to the inertial measurement unit 20, a bus interface circuit 633 and an interrupt circuit 634 connected to the common bus 55 respectively. The multi-channel frequency/digital converter circuit board 63 further comprises a multi-channel frequency/digital circuit connected between the Inc/Dec pulse separation circuit 631 and the bus interface circuit 633.

Referring to FIG. 9, in step (2), the pulse IMU signals are passed to the multi-channel frequency/digital circuit 632 via the Inc/Dec pulse separation circuit 631 from the inertial measurement unit 20, where the Inc/Dec pulse separation circuit 631 regulates the pulse IMU signals. The multi-channel frequency/digital circuit 632 converts the regulated pulse IMU signals into digital data. Once the conversion is finished, the digital IMU data are passed to the bus interface circuit 633. The bus interface 633 coverts the digital IMU into common bus compatible digital data and outputs them to the common bus 55. The bus interface circuit 633 triggers the interrupt circuit 634 to generate interrupt signal. The interrupt signal informs the navigation processing board 80 and the control board 53 that the IMU data is ready via the common bus 55.

Figure 10:
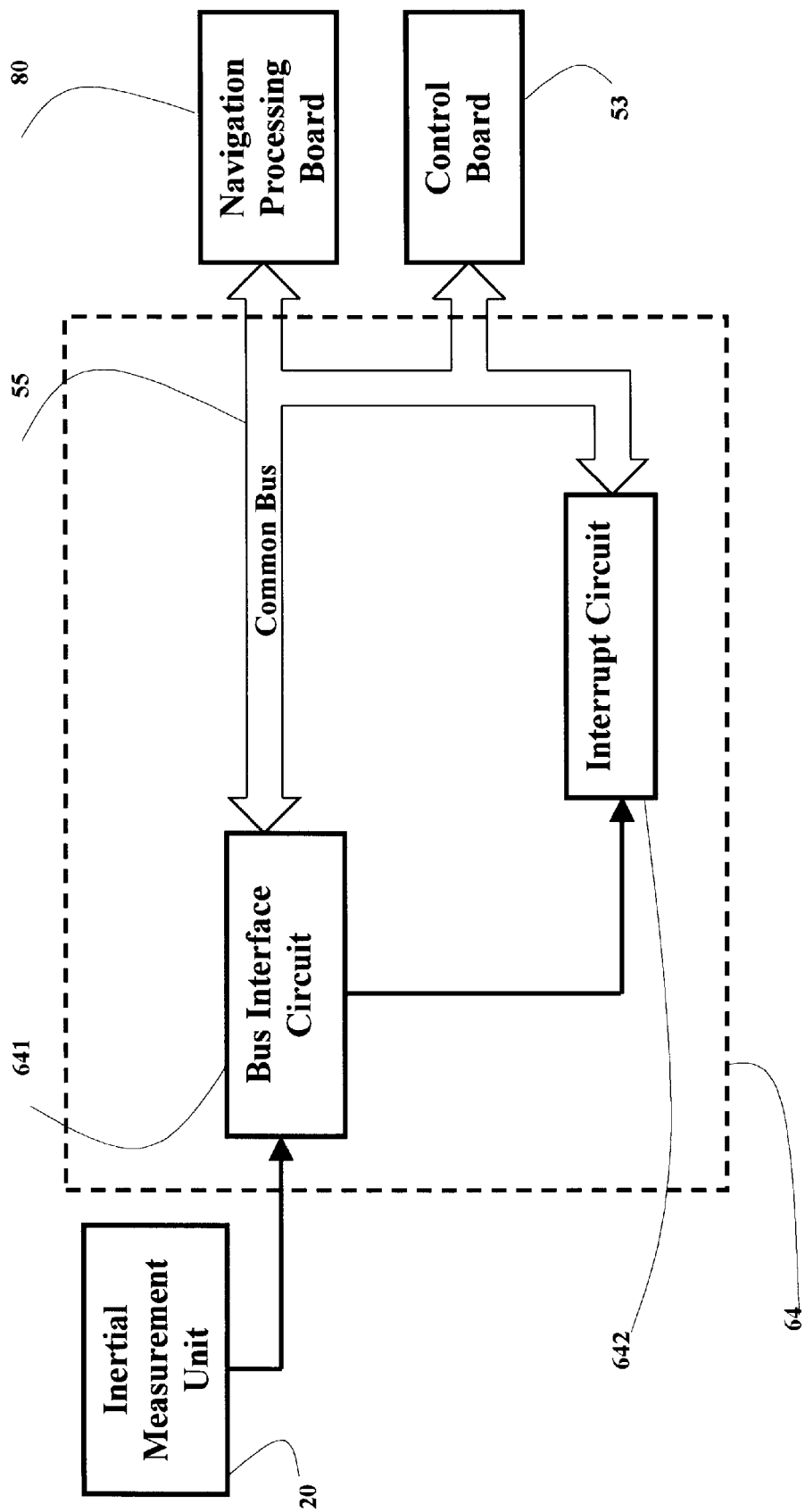
FIG. 10 is a block diagram of a parallel digital signal interface according to the present invention.

Some IMUs have embedded logic circuits or microprocessors which can output parallel digital signals or even implement a standard parallel bus. As shown in FIG. 10, the parallel digital signal interface 64 comprises a bus interface circuit 641 connected between the inertial measurement unit 20 and the common bus 55, and an interrupt circuit 642 connected between the bus interface circuit 641 and the common bus 55.

Referring to FIG. 10, in step (2), the parallel IMU signal are received by the bus interface circuit 641 from the inertial measurement unit 20 and converted into the common bus compatible data. After receiving the parallel IMU data, the bus interface circuit 641 triggers the interrupt circuit 642 to generate interrupt signal which is used to inform the navigation processing board 80 and the control board 53 via the common bus 55 that the IMU data are ready. The bus interface circuit 641 outputs the IMU to the common bus 55, and the navigation processing board 80 and the control board 53 receive the IMU data from the common bus 55.

According to possible types of the IMU output signals, we designed different types of signal converting circuits to produce digital data of body acceleration and rotation. These signal converting circuits are designed as a series of optional modules to accommodate diverse original IMU signal outputs. In this design, the entire universal vehicle navigation and control box is re-configurable.

It is well known that global positioning system has a poor accuracy of vertical positioning. The long term accuracy of global positioning and inertial navigation system integration solution mainly depends on the performance of the global positioning system. It means that the global positioning and inertial integrated navigation system can not improve the vertical positioning performance. In the present invention, an altitude measurement device is incorporated to improve this drawback.

There are many different altitude measurement devices, such as barometric device 31 and radar altimeter 32. The altitude interface and processing board 70 includes a barometric device interface 71 and a radar altimeter interface 72. They are used to convert the measurement of a barometric device 31 or a radar altimeter 32 into digital data of platform height over mean sea level (MSL).

Figure 11:
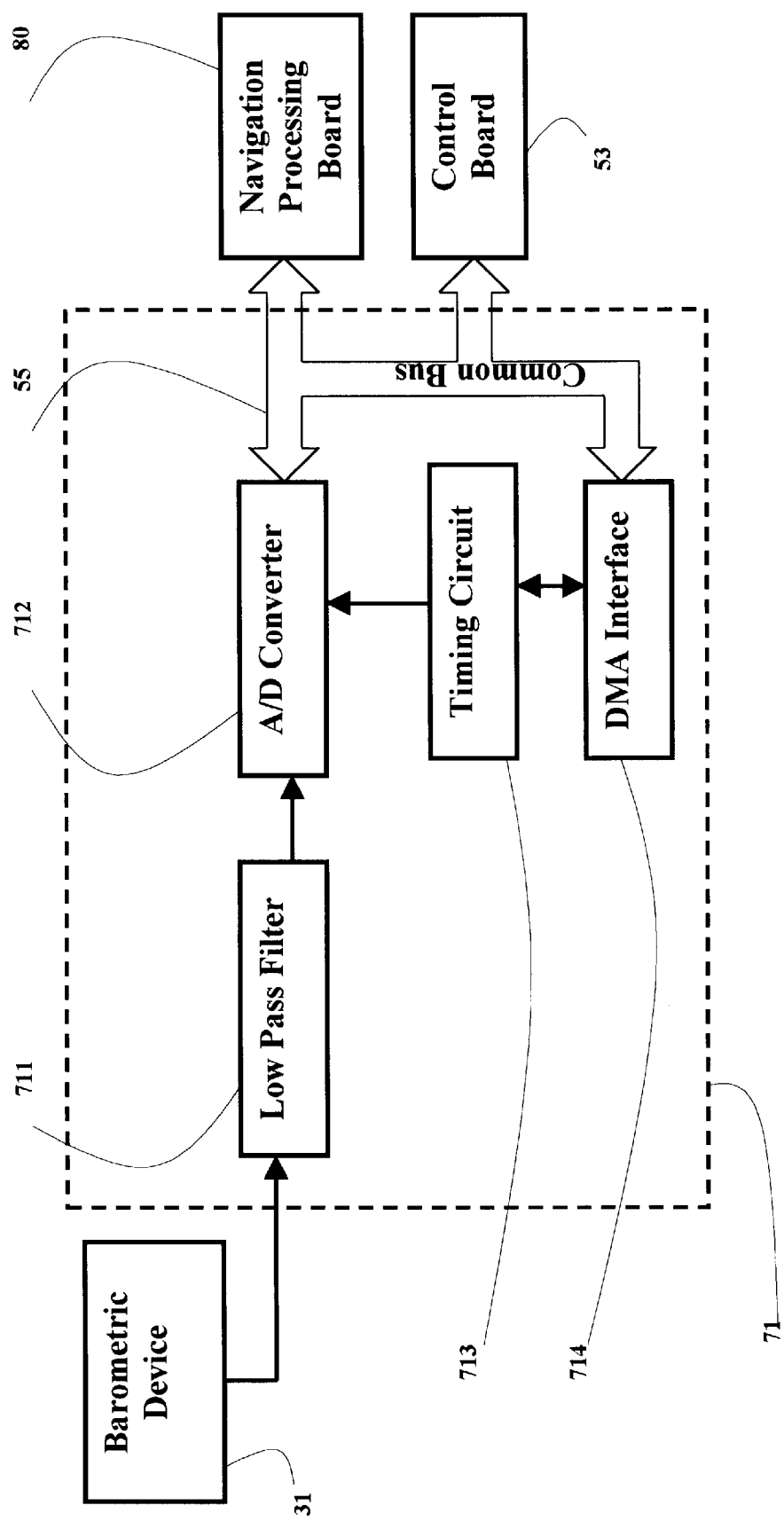
FIG. 11 is a block diagram illustrating the altitude interface and preprocessing board for a barometric device according to the present invention.

Many airplanes equipped with barometric device which provides the airplane height above the MSL. As shown in FIG. 11, the barometric device interface 71 is a multi-channel A/D converter circuit board for converting analog height information into digital data, which comprises a low pass filter 711 connected to the barometric device 31, an A/D converter circuit 712 connected between the low pass filter 711 and the common bus 55, and a DMA interface 714 connected to the common bus 55. The barometric device interface 71 further comprises a timing circuit 713 connected between the A/D converter circuit 712 and the DMA interface 714.

Referring to FIG. 11, in step (3), the analog altitude signal from the barometer device 31 is filtered by the low pass filter 711. The filtered analog altitude signal is sent to the A/D converter 712. The timing circuit 713 provides sampling frequency for the A/D converter 712. The A/D converter 712 samples and digitizes the filtered analog altitude signal. Timing circuit 713 also triggers the DMA interface 714. After sampling and digitizing operation of the A/D converter 712, the DMA interface informs the navigation processing board 80 and the control board 53 via the common bus 55 to get altitude data on the common bus 55. After receiving of the DMA signal by the navigation processing board 80 and the control board 53, the A/D converter 712 outputs the digitized altitude data on the common bus 55.

Figure 12:
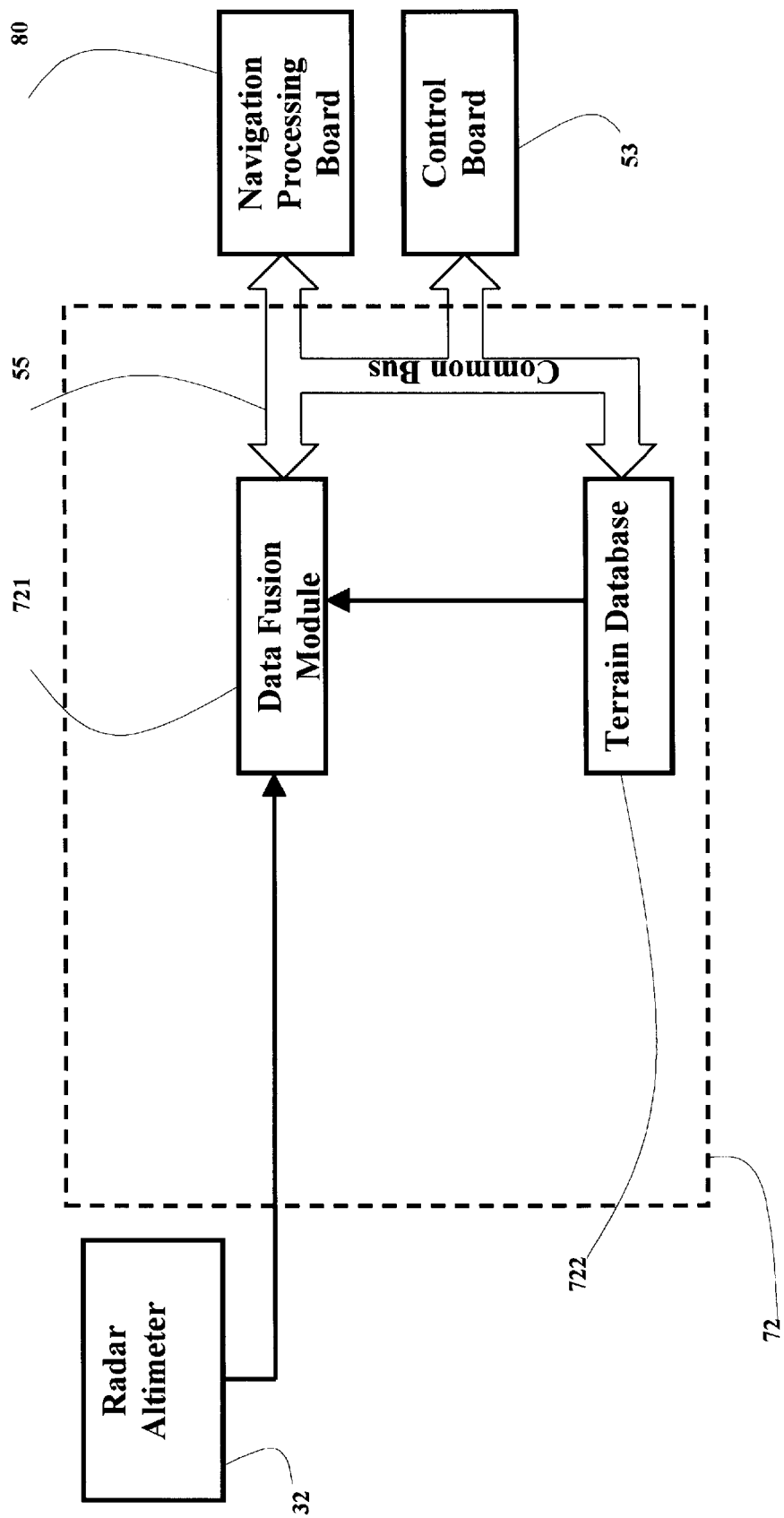
FIG. 12 is a block diagram illustrating the altitude interface and preprocessing board for a radar altimeter according to the present invention.

Many airplanes also equipped with radar altimeter which provides the airplane height above the terrain. The height produced by a radar altimeter is called terrain altitude. As shown in FIG. 12, the radar altimeter interface 72 comprises a data fusion module 721 connected between the radar altimeter 32 and the common bus 55, and a terrain database 722 connected between the data fusion module 721 and the common bus. The terrain database 722 receives the position information from the navigation processing board 80 through the common bus 55. Based on current position, the database queries the terrain elevation above the MSL and output it to the data fusion module 721. The data fusion module 721 combines the terrain altitude from the radar altimeter 32 and the terrain elevation from the terrain database 722 to generate the airplane height above the MSL.

Figure 13:
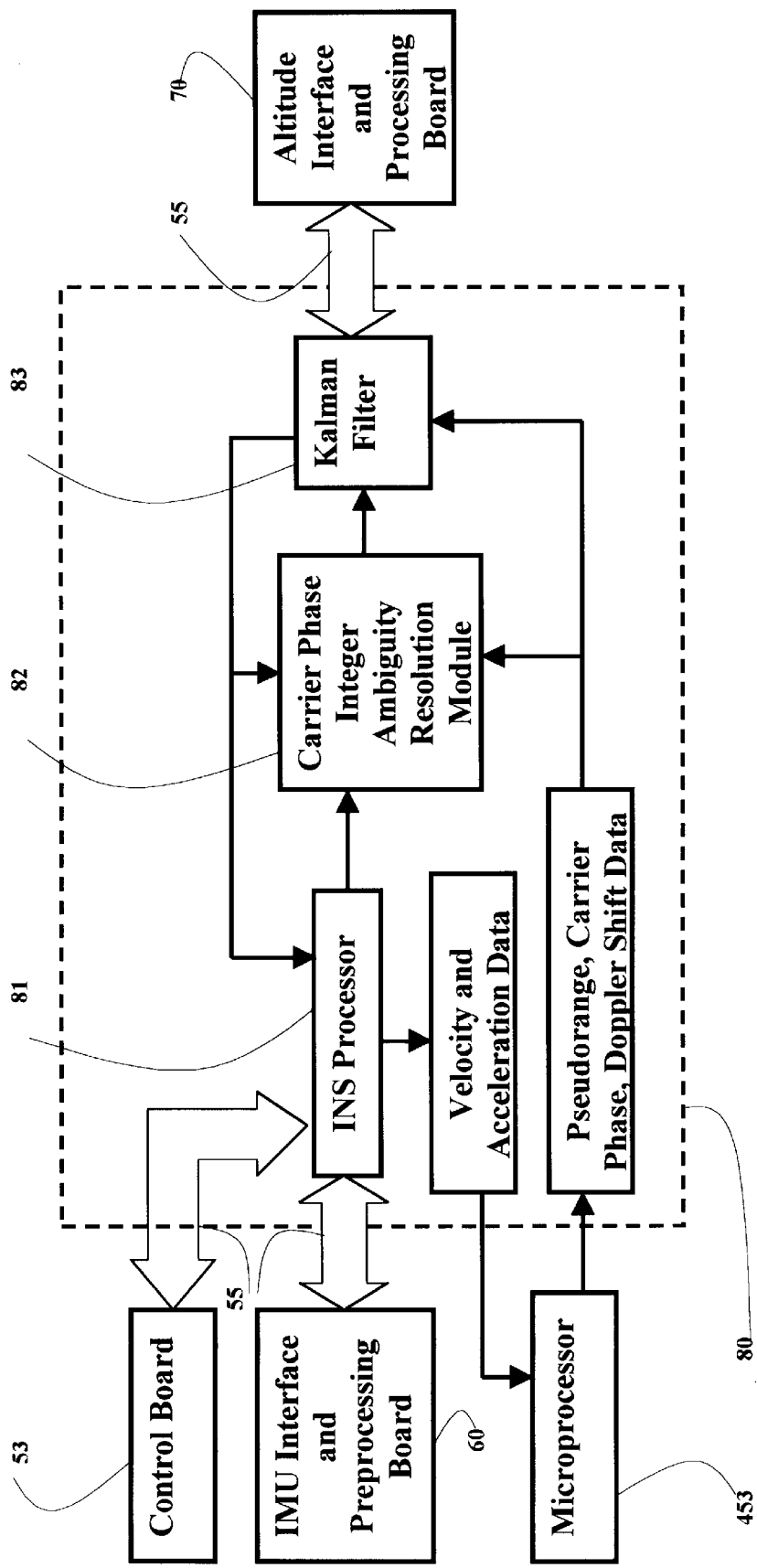
FIG. 13 is a block diagram of the integrated navigation processing of the navigation processing board, including the global positioning system, the inertial sensor, and altitude measurement device, according to the above first preferred embodiment of the present invention.

According to the first preferred embodiment of the present invention, the navigation processing board 80 is given in FIG. 13 in which the measurements coming from the inertial measurement unit 20, the signal processor 45 of global positioning system processor 40, and the altitude measurement device 30 are blended to derive high precision navigation information including 3 dimensional position, 3 dimensional velocity, and 3 dimensional attitude. These data are output from the INS processor 81 and are passed to the control board 53 through the common bus 55. As mentioned above, the velocity and acceleration information are also fed back to the signal processor 45 of the global positioning system processor 40 to aid the global positioning system satellite signal code and carrier phase tracking.

Referring to FIG. 13, in step (2), the IMU measurements coming from the IMU interface and preprocessing board 60, which are body rates and accelerations, are collected by an INS processor 81 to perform inertial navigation processing.

Figure 4:
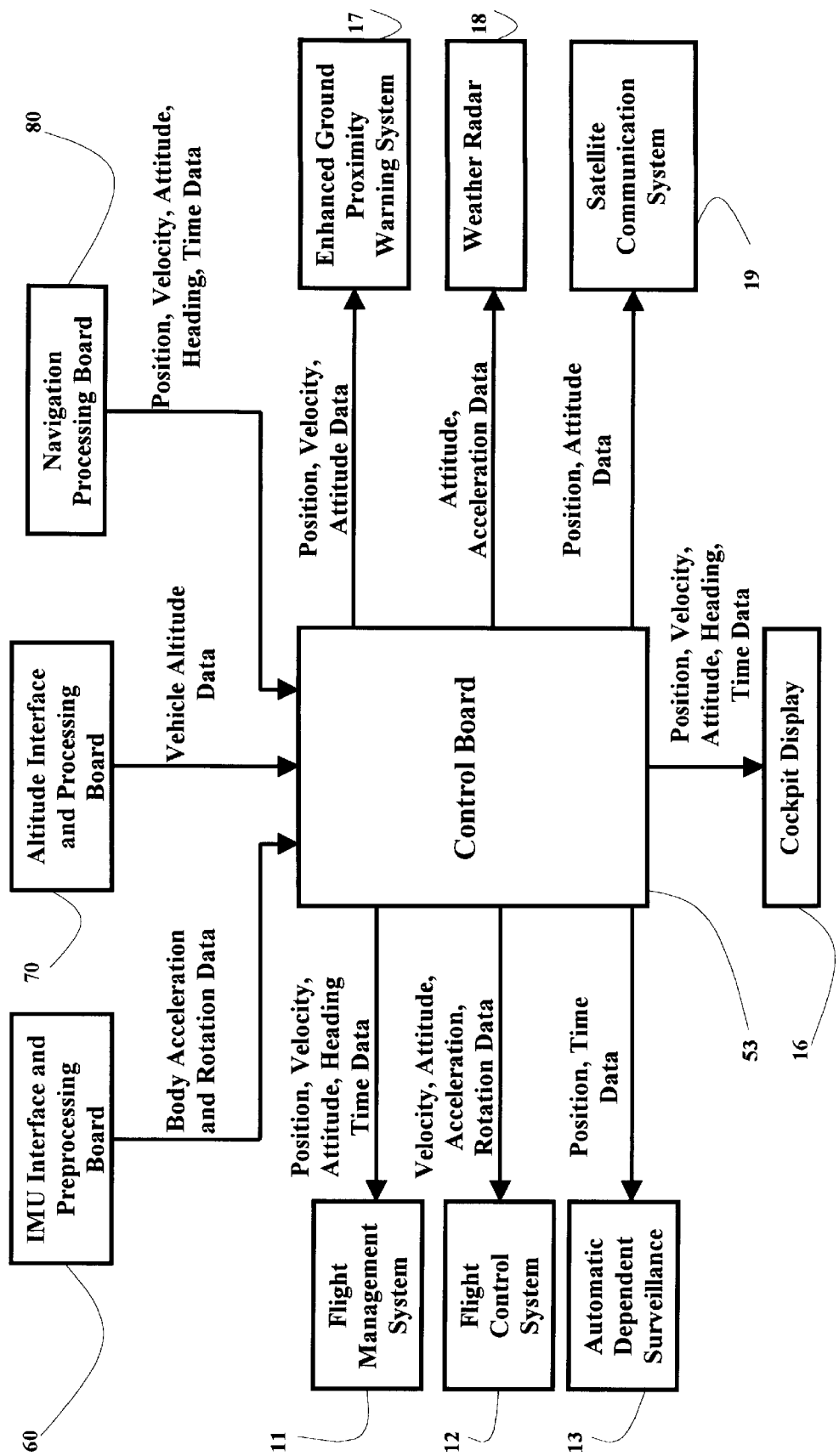
FIG. 4 is a block diagram illustrating the navigation and sensor data flow inside the universal vehicle navigation and control box, as well as the data flow between the control board and other avionics systems according to the present invention.

Referring to FIG. 4, in step (2), the IMU measurements coming from the IMU interface and preprocessing board 60, which are body rates and accelerations, are sent to the control board 53 through the common bus 55.

Referring to FIG. 13, in step (3), the altitude measurement coming from the altitude interface and processing board 70 is collected by a kalman filter 83 to perform integrated filtering processing.

Referring to FIG. 4, in step (3), the altitude measurement coming from the altitude interface and processing board 70 is sent to the control board 53 through the common bus 55.

Referring to FIG. 13, in step (5), the microprocessor 454 of the global positioning system processor 40 outputs the pseudorange, Doppler shifts, global positioning system satellite ephemeris, as well as atmosphere parameters to the kalman filter 83 in which the data from the INS processor 81, the altitude interface and processing board 70, the carrier phase integer ambiguity resolution module 42, and the microprocessor 454 of the global positioning system processor 40 are integrated to derive the position error, velocity error, and attitude error. In step (4), the INS processor 81 processes the inertial measurements, which are body angular rates and accelerations, and the position error, velocity error, and attitude error coming from the kalman filter 83 to derive the corrected navigation solution. The navigation solution includes 3-dimensional position, 3-dimensional velocity, and 3-dimensional attitude. These data are output into the kalman filter 83. On the other hand, in step (10), these data are also passed to the control board 53 via the common bus 55.

Figure 16:
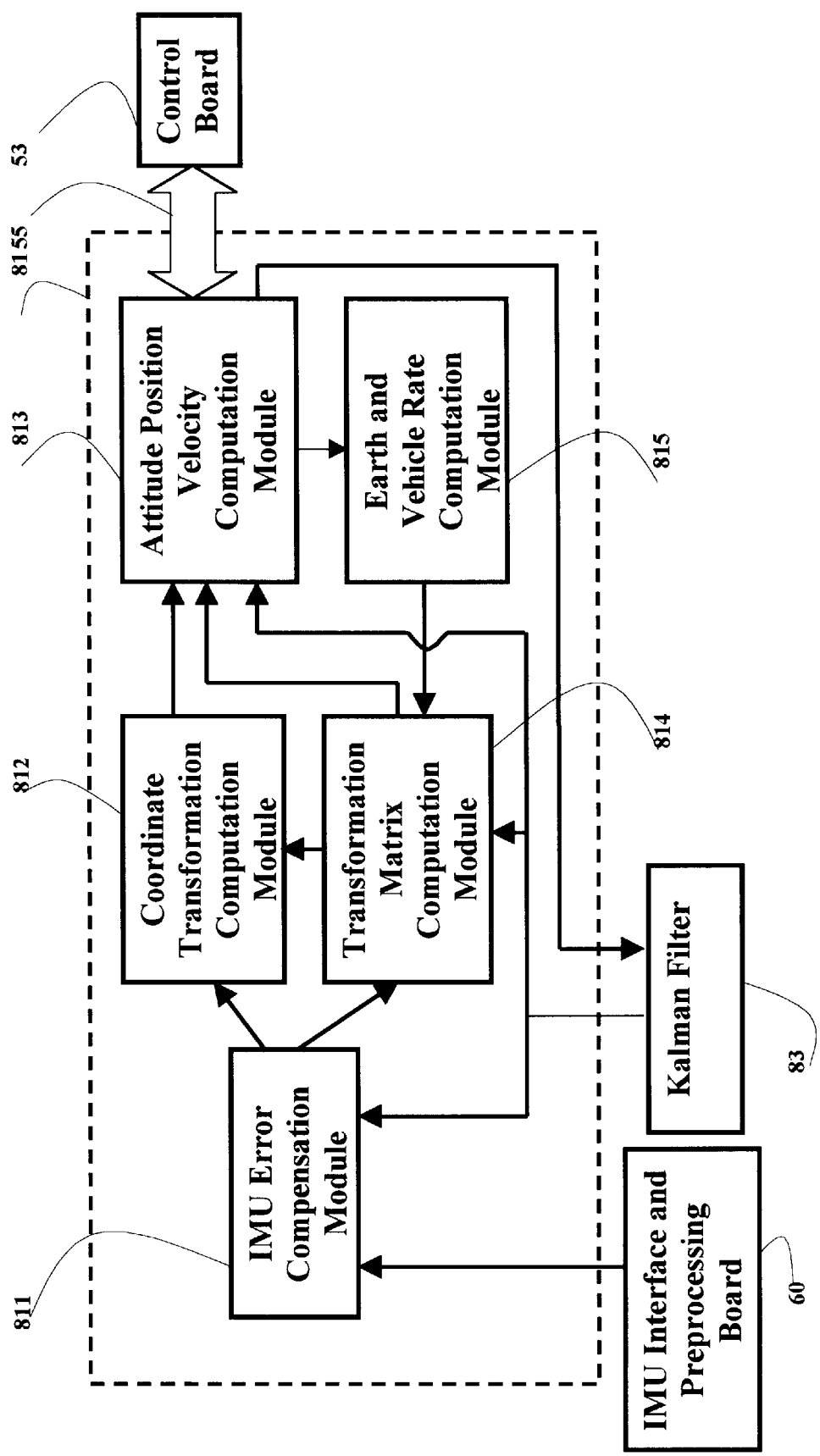
FIG. 16 is a block diagram of the inertial navigation system processing of the navigation processing board according to the above both preferred embodiment of the present invention.

As shown in FIG. 16, the INS processor 81 comprises an IMU error compensation module 811, a coordinate transformation computation module 812, an attitude position velocity computation module 813, a transformation matrix computation module 814, and an earth and vehicle rate computation module 815.

Referring to FIG. 16, in step (4), the IMU error compensation module 811 collects the body angular rates and accelerations data from the IMU interface and preprocessing board 60. These data are corrupted by the inertial sensor measurement errors. The IMU error compensation module 811 receives the sensor error estimates derived from the kalman filter 83 to perform IMU error mitigation on the digitized IMU data. The corrected inertial data are sent to coordinate transformation computation module 812 and transformation matrix computation module 814, where the body angular rates are sent to the transformation matrix computation module 814 and the accelerations are sent the coordinate transformation computation module 812.

Referring to FIG. 16, in step (4), the transformation matrix computation module 814 receives the body angular rates from the IMU error computation module 811 and the earth and vehicle rate from the earth and vehicle rate computation module 815 to perform transformation matrix computation. The transformation matrix computation module 814 sends the calculated transformation matrix to the coordinate transformation computation module 812 and attitude position velocity computation module 813. The attitude update algorithm in the transformation matrix computation module 814 uses the quaternion method because of its advantageous numerical and stability characteristics. The differential equation of the relative quaternion between the body frame and the local navigation frame is:

$$\dot{q} = \tfrac{1}{2}[\Omega_b]q - \tfrac{1}{2}[\Omega_n]q$$

where, $q^T=[q_0 \ q_1 \ q_2 \ q_3]$ is a four-component vector of quaternion parameters, $\Omega_b$ is the skew-symmetric matrix of the vector, $\Omega_{ib}^b$, which is sensed by the gyro and is the rotation rate vector of the body frame (b) relative to the inertial frame (i) in the body frame.

$$[\Omega_b] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix}, \omega_{ib}^b = [\omega_{bx}, \omega_{by}, \omega_{bz}]^T$$

$\Omega_n$ is the skew-symmetric matrix of the vector, $\omega_{in}^n$, which is the rotation rate vector of the local navigation frame (n) relative to the inertial frame in the navigation frame.

$$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix}, \omega_{in}^b = [\omega_{nx}, \omega_{ny}, \omega_{nz}]^T$$

If the navigation frame is the local, level North, East, and Down (NED) navigation frame, then:

$$\omega_{in}^b = \begin{bmatrix} (\omega_e + \dot\lambda)\cos L \\ -\dot L \\ -(\omega_e + \dot\lambda)\sin L \end{bmatrix}$$

where, $\omega_e$ is the Earth's rotation rate, L is the geodetic latitude, and $\lambda$ is the longitude.

Referring to FIG. 16, in step (4), the coordinate transformation module 812 collects the specific forces from the IMU error computation module 811 and the transformation matrix from the transformation matrix computation module 814 to perform the coordinate transformation. The coordinate transformation computation sends the acceleration transferred into the coordinate system presented by the transformation matrix to the attitude position velocity computation module 813.

Referring to FIG. 16, in step (4), the attitude position velocity computation module 813 receives the transformed accelerations from the coordinate transformation computation module 812 and the transformation matrix from the transformation matrix computation module 814 to perform the attitude, position, velocity update. A general navigation equation that describes the motion of a point mass over the surface of the Earth or near the Earth has the following form:

$$\dot V(t) = a - (2\omega_{ie} + \omega_{en}) \times V - \omega_{ie} \times \omega_{ie} \times r$$

where, a and V are the acceleration and velocity of the vehicle relative to the Earth in the navigation frame, $\omega_{ie}$ is the Earth rotation vector, $\omega_{en}$ is the angular rate of the navigation frame relative to the earth, r is the position vector of the vehicle with respect to the Earth's center.

Because the accelerometers do not distinguish between vehicle acceleration and the mass attraction gravity, the specific vector, f, sensed by the accelerometers is:

$$f = a - g(r)$$

where, g(r) is a combination of the earth's gravity and the centrifugal force at the vehicle location. Thus, $$\dot V(t) = f - (2\omega_{ie} + \omega_{en}) \times V + g(r)$$

where, $$\omega_{ie}^n = \begin{bmatrix} \omega_e \cos L \\ 0 \\ -\omega_e \sin L \end{bmatrix}, \omega_{en}^n = \begin{bmatrix} \dot\lambda \cos L \\ -\dot L \\ -\dot\lambda \sin L \end{bmatrix}.$$

The vehicle velocity is updated by the following:

$$\dot V^n = C_b^n f^b + M V^n + g^n$$

where, $C_b^n$ is the direction cosine matrix from the body frame to the navigation frame, and $$V^n = \begin{bmatrix} v_n \\ v_e \\ v_d \end{bmatrix}, f^b = \begin{bmatrix} f_{bx} \\ f_{by} \\ f_{bz} \end{bmatrix}, g^n = \begin{bmatrix} 0 \\ 0 \\ g_d \end{bmatrix},$$

$$M = \begin{bmatrix} 0 & -(2\omega_e + \dot\lambda)\sin L & \dot L \\ (2\omega_e + \dot\lambda)\sin L & 0 & (2\omega_e + \dot\lambda)\cos L \\ -\dot L & -(2\omega_e + \dot\lambda)\cos L & 0 \end{bmatrix}$$

Using the normal gravity formula for the WGS-84 ellipsoid results in the following expressions:

$$g_d = g_0 \left[1 - 2(1 + f + m)\frac{h}{a} + \left(\frac{5}{2}m - f\right)\sin^2 L\right]$$

$$(m = \omega_{ie}^2 a^2 b / GM)$$

where, $g_0$ is the gravity at the equator, f is the elliptical flattening, h is the altitude, a is the semi-major axis value, b is the semi-minor axis value, GM is the earth's gravitational constant.

The differential equations for the position update of the geodetic latitude, L, longitude, $\lambda$, and height, h, are given by:

$$\dot L = \frac{V_n}{R_M + h}, \dot\lambda = \frac{V_e}{(R_N + h)\cos L}, \dot h = -v_d$$

where, $R_M$ is the radius of the curvature in the Meridian, $R_H$ is the radius of the prime vertical.

Referring to FIG. 16, in step (4), after the computation of the position and velocity, the position and velocity errors calculated by the kalman filter 83 are used in the attitude position velocity computation module 813 to correct the inertial solution. For the attitude correction, two methods can be applied. First approach is to send the attitude errors computed by the kalman filter 83 to the attitude position velocity computation module 813 to perform attitude correction in the attitude position velocity computation module 813. The second approach is to send the attitude errors computed by the kalman filter 83 to the transformation matrix computation module 814 to perform the attitude correction before the attitude position velocity computation module 813.

Referring to FIG. 16, in step (5), the corrected inertial solution obtained from the attitude position velocity computation module 813 is passed to the kalman filter 83 to construct the measurements of the kalman filter 83. Referring to FIG. 13, in step (8), the corrected inertial navigation solution is also sent to the carrier phase integer ambiguity resolution module 82 to aid the global positioning system satellite carrier phase integer ambiguity fixing. Referring to FIG. 13, in step (7), the corrected velocity and accelerate is passed to microprocessor 454 of the global positioning system process 40 to aid the global positioning system satellite signal carrier phase and code tracking. Referring to FIG. 16, in step (10), the attitude, position, and velocity information are sent to the control board 53 via the common bus 55.

Referring to FIG. 16, in step (4), the attitude, position, and velocity computed by the attitude position velocity computation module 813 are sent to the earth and vehicle rate computation module 815 to calculate the Earth rotation and the vehicle rotation rate. The calculated Earth and vehicle rates are sent to the transformation matrix computation module 814.

It is well known that a kalman filter 83 produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the universal vehicle navigation and control board, an alternative mode of a kalman filter for position and attitude derivation is a robust kalman filter. This robust kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

The robust kalman filter has the characteristic that it provides near-optimum performance over a large class of process and measurement models. The pure kalman filter is not robust since it is optimal for only one particular process and measurement model. If the filter is not correct the filter covariance may report accuracy which is different from what can actually be achieved. The purpose of filter integrity is to ensure that the predicted performance from the error covariance is close to the actual estimation error statistics. In addition, filter divergence is usually caused by a changing process or measurement model or a sensor failure.

Figure 17:
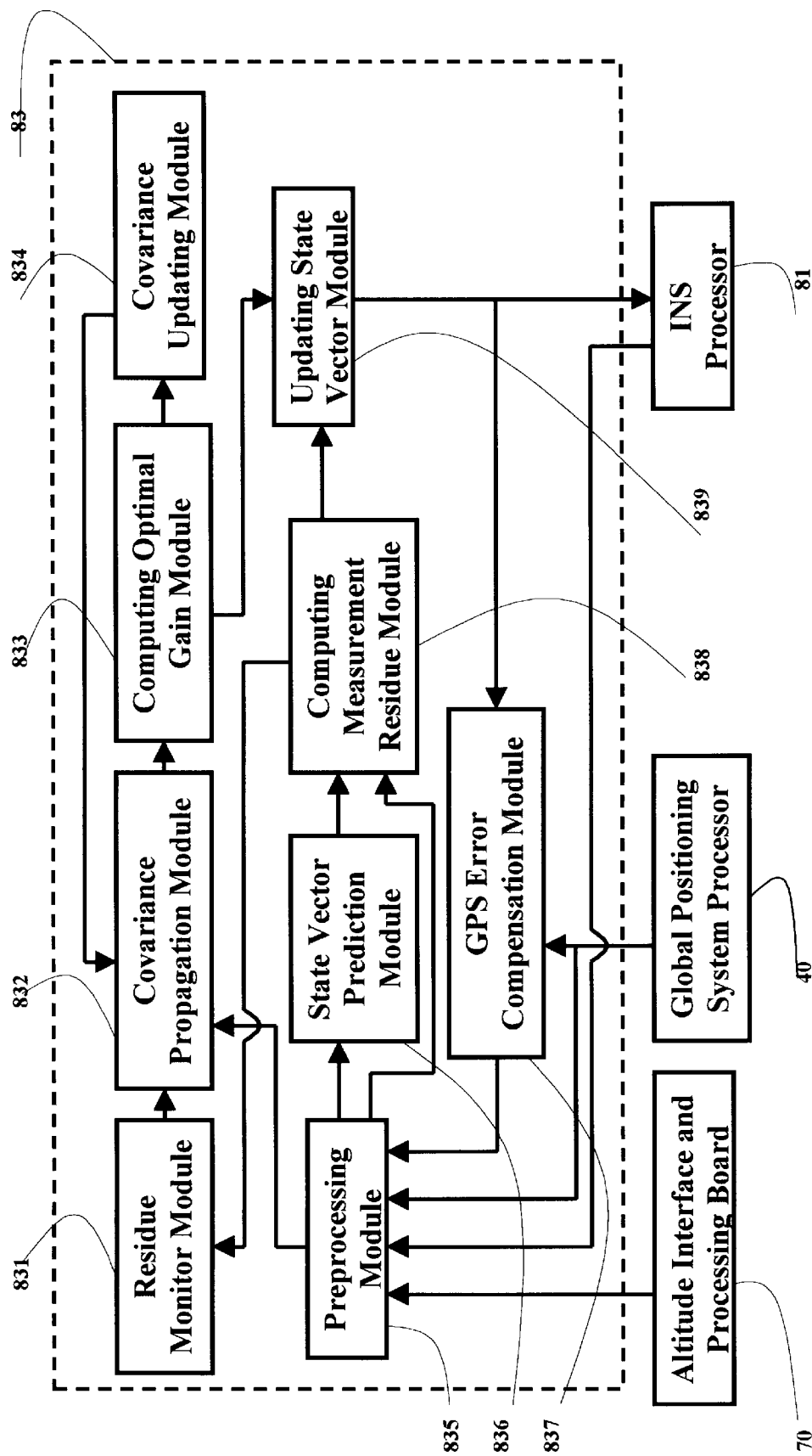
FIG. 17 is a block diagram of the robust kalman filter implementation of the navigation processing board according to the above both preferred embodiment of the present invention.

The present invention utilizes a residual monitoring method to obtain a robust kalman filter which is used to blend the global positioning system data, inertial sensor measurement, and the altitude measurement from an altitude measurement device. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 17 illustrates the implementation of the robust kalman filter including a residues monitor function.

Referring to FIG. 17, in step (5), a GPS error compensation module 837 gathers the GPS raw measurements including pseudorange, carrier phase, and Doppler frequency from the global positioning system processor 40, and the position and velocity corrections from a updating state vector module 839 to perform GPS error compensation. The corrected GPS raw data are sent to the preprocessing module 835.

Referring to FIG. 17, in step (5), a preprocessing module 835 receives the altitude measurement from the altitude interface and processing board 30, the GPS satellite ephemeris from the global positioning system processor 40, the corrected GPS raw data including pseudorange, carrier phase, and Doppler frequency from a GPS error compensation module 837, and INS navigation solutions from the INS processor 81. The preprocessing module 835 performs the calculation of the state transit matrix and sends it as well as the previous state vector to a state vector prediction module 836. The calculated state transit matrix is also sent to a covariance propagation module 832. The preprocessing module 835 calculates the measurement matrix and the current measurement vector according to the computed measurement matrix and the measurement model. The measurement matrix and the computed current measurement vector are passed to a computing measurement residue module 838.

Referring to FIG. 17, in step (5), the state vector prediction module 836 receives the state transit matrix and the previous state vector from the preprocessing module 835 to perform state prediction of current epoch. The predicted current state vector is passed to the computing measurement residue module 838.

Referring to FIG. 17, in step (5), the computing measurement residue module 838 receives the predicted current state vector from the state vector prediction module 836 and the measurement matrix and the current measurement vector from the preprocessing module 835. The computing measurement residue module 838 calculates the measurement residues by subtracting the multiplication of the measurement matrix and the predicted current state vector from the current measurement vector. The measurement residues are sent to a residue monitor module 831 as well as the updating state vector module 839.

Referring to FIG. 17, in step (5), the residue monitor module 831 performs a discrimination on the measurement residues received from the computing measurement residue module 838. The discrimination law is whether the square of the measurement residues divided by the residual variance is larger than a given threshold. If the square of the measurement residues divided by the residual variance is larger than this given threshold, the current measurement may leads to the divergence of the kalman filter. When it occurs, the residue monitor module 831 calculates a new covariance of system process or rejects the current measurement. If the square of the measurement residues divided by the residual variance is less than this given threshold, the current measurement can be used by the kalman filter without changing current covariance of system process to obtain the current navigation solution. The covariance of system process is sent to the covariance propagation module 832.

Referring to FIG. 17, in step (5), the covariance propagation module 832 gathers the covariance of system process from the residue monitor module 831, the state transit matrix from the preprocessing module 835, and the previous covariance of estimated error to calculate the current covariance of the estimated error. The computed current covariance of the estimated error is sent to a computing optimal gain module 833.

Referring to FIG. 17, in step (5), the computing optimal gain module 833 receives the current covariance of the estimated error from the covariance computing module 832 to compute the optimal gain. This optimal gain is passed to a covariance updating module 834 as well as the updating state vector module 839. The covariance updating module 834 updates the covariance of the estimated error and sends it to the covariance propagation module 832.

Referring to FIG. 17, in step (5) the updating state vector receives the optimal gain from the computing optimal gain module 833 and the measurement residues from the computing measurement residue module 838. The updating state vector calculates the current estimate of state vector including position, velocity and attitude errors and sends them to the GPS error compensation module 837 and the INS processor 81.

As well known, more accurate positioning with GPS is obtained by using of carrier phase measurement than by using of pseudorange measurements only. This is because at the global positioning system satellite L1 broadcasting frequency, 1575.42 MHz, one cycle of carrier is only 19 centimeters as compared to that of one cycle of the C/A code which is around 300 meters. The high accuracy of positioning with GPS carrier phase measurement is based on the prior condition that the phase ambiguities have been solved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is the presence of satellite ephemeris error, satellite clock bias, atmospheric propagation delay, multipath effect, receiver clock error and receiver noise in range measurements from GPS code tracking loop, we can only get a non-precise geometric distance from the receiver to the satellite which is called a code pseudorange.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal, thus the probability of signal loss or cycle slip are reduced.

Referring to FIG. 13, in step (8), the carrier phase integer ambiguity resolution module 82 collects the position and velocity data from the INS processor 81, the carrier phase and Doppler shift measurement from the microprocessor 454 of the global positioning system processor 40, and the covariance matrix from the kalman filter 83 to fix the global positioning system satellite signal integer ambiguity number. After fixing of carrier phase ambiguities, in step (9), the carrier phase ambiguity number is passed to the kalman filter 83 to further improve the measurement accuracy of the global positioning system raw data.

Figure 18:
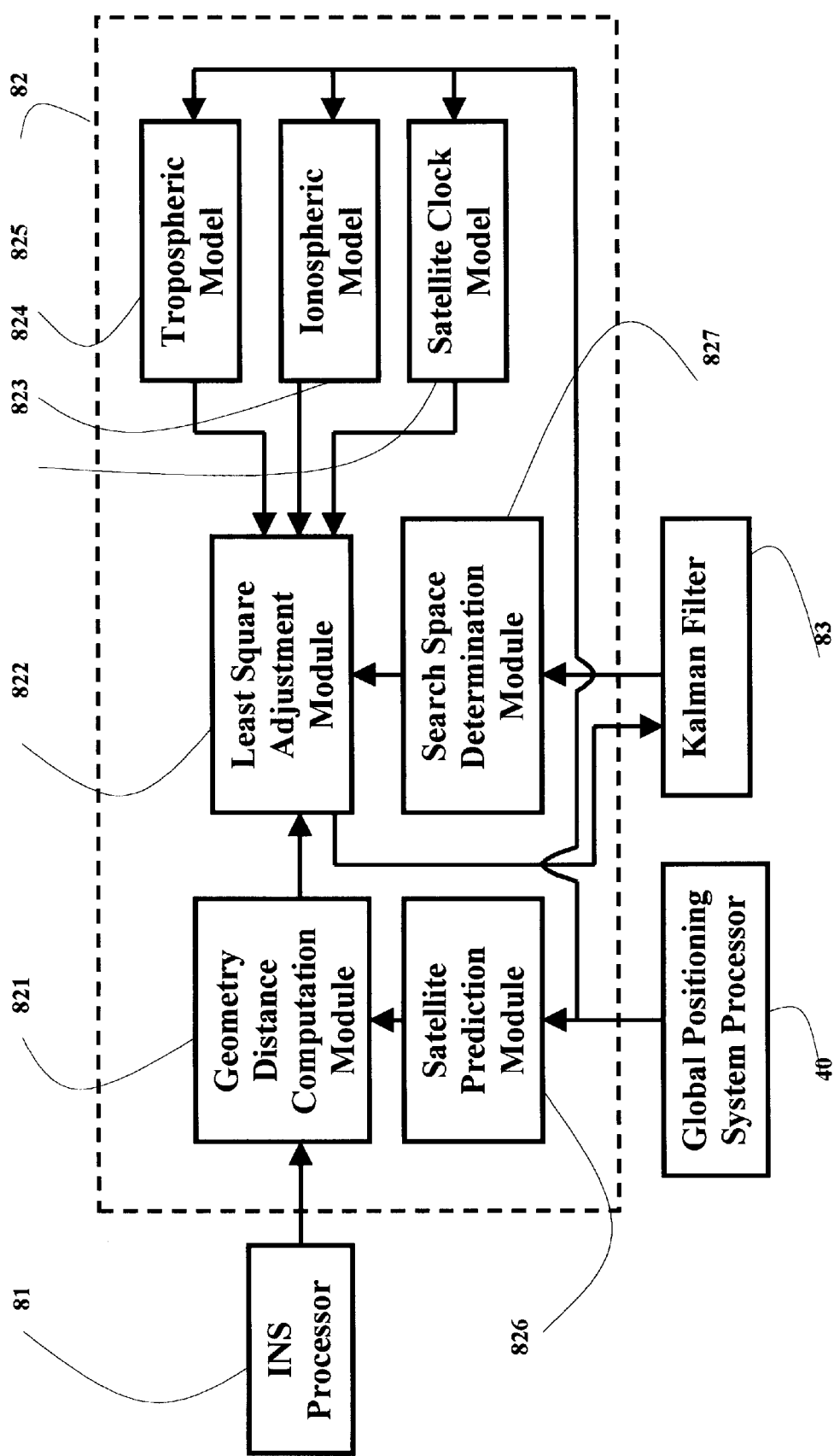
FIG. 18 is a block diagram of the global positioning system satellite signal carrier phase ambiguity resolution of the navigation processing board with aiding of inertial navigation system according to the above first preferred embodiment of the present invention.

Referring to FIG. 18, the IMU aiding global positioning system satellite signal carrier phase integer ambiguity resolution 82 comprises a geometry distance computation module 821, a least square adjustment module 822, a satellite clock model 823, an ionospheric model 824, a tropospheric model 825, a satellite prediction module 826, and a search space determination module 827.

A basic feature of global positioning system satellite signal carrier phase ambiguity is that there is no time dependency as long as tracking is maintained without interruption. The carrier phase measurement can be represented as:

$$\Phi = \frac{1}{\lambda}\rho + f\Delta\delta + N + \frac{d_{eph}}{\lambda} - \frac{d_{iono}}{\lambda} + \frac{d_{trop}}{\lambda} + \varepsilon$$

where, $\Phi$ is the measured carrier phase, $\lambda$ is the signal wavelength; $\rho$ is the true geometric distance between the receiver and satellite; f is the signal frequency; $\Delta\delta=\delta^S-\delta_R$ is the clock error, $\delta^S$ is the satellite clock bias, $\delta_R$ is the receiver error; N is the carrier phase integer ambiguity; $d_{eph}$ is the range error induced by ephemeric error; $d_{iono}$ is the propagation error induced by ionosphere; $d_{trop}$ is the propagation error induced by troposphere; $\epsilon$ is the phase noise.

When dual frequency is available (using an L1 and L2 dual frequency global positioning system receiver), the dual frequency carrier phase measurements can be used to cancel almost all of the ionospheric error which is the main error source for range measurement. Furthermore, the IMU aiding carrier phase ambiguity resolution is also applied to the wide-lane signal formed between the dual frequency carrier phase measurements. The wide-lane signal can be expressed as $$\Phi_w=\Phi_{L1}-\Phi_{L2}$$

where $\Phi_{L1}$ is the L1 channel carrier phase measurement; $\Phi_{L2}$ is the L2 channel carrier phase measurement. The corresponding wide-lane frequency and phase ambiguity are $f_w=f_{L1}-f_{L2}$, $N_w=N_{L1}-N_{L2}$.

The problem of fixing carrier phase ambiguity is further complicated by the need to re-determine the ambiguities every time when lock to satellite is lost (this phenomenon is called a cycle slip). The cycle slip must be detected and repaired to maintain high precision navigation solutions. Three sources for cycle slips can be distinguished. First, cycle slips are caused by obstructions of the satellite signal due to trees, buildings, bridges, mountains, etc. This source is the most frequent one. The second source for cycle slips is a low signal-to-noise ratio (SNR) due to bad ionospheric conditions, multipath, high receiver dynamics, or low satellite elevation. A third source is the receiver oscillator. In this present invention, the IMU aiding is also used for the cycle slip detection and repairing.

Referring to FIG. 18, in step (8), the satellite prediction module 826 collects the ephemeris of visible global positioning system satellites from the global positioning system processor 40 to perform satellite position calculation. The predicted satellite position is passed to the geometry distance computation module 821. The geometry distance computation module 821 receives the vehicle's precision position information from the INS processor 81. Based on the position information of the satellite and the vehicle, the geometrical distance between the satellite and the vehicle is computed by the geometry distance computation module 821 which is different from the pseudorange derived from the code tracking loop of the global positioning system processor 40. The resolved geometrical distance is sent to the least square adjustment module 822.

Referring to FIG. 18, in step (8), the tropospheric model 825 collects the time tag from the global positioning system processor 826 and calculates the tropospheric delay of the global positioning system satellite signal using the embedded tropospheric delay model. The calculated trosheric delay is sent to the least square adjustment module 822.

Referring to FIG. 18, in step (8), the ionospheric model 824 collects the time tag and the ionospheric parameters broadcast by the global positioning system satellite from the global positioning system processor 40. Using these ionospheric data and the embedded ionospheric delay model, the ionospheric model 824 calculates the minus time delay introduced by the ionosphere. The calculated ionospheric delay is sent to the least square adjustment module 822.

Referring to FIG. 18, in step (8), the satellite clock model 823 collects the global positioning system satellite clock parameters to perform the satellite clock correction calculation. The satellite clock correction is also sent to the least square adjustment module 822.

Referring to FIG. 18, in step (8), the search space determination module 827 receives the covariance matrix of the measurement vector from the kalman filter 83. Based on the covariance matrix, the search space determination module 827 derives the measurement error and determine the global positioning system satellite carrier phase integer ambiguity search space. The carrier phase ambiguity search space is sent to the least square adjustment module 822.

Referring to FIG. 18, in step (8), the least square adjustment module 822 gathers the geometrical distance from the vehicle to the global positioning system satellite from the geometry distance computation module 821, the tropospheric delay from the tropospheric model 825, the ionospheric delay from the ionospheric model 824, and the satellite clock correction from the satellite clock model 823 to calculate the initial search origin. The least square adjustment module 822 also receives the search space from the search space determination module 827. A standard least square adjustment algorithm applied to the initial search origin and the search space to fix the carrier phase ambiguity.

Referring to FIG. 3, the bus interface 55 provides an interface between the universal vehicle navigation and control box and the data bus 15. Referring to FIGS. 1, 3, and 4, in step (11), the control board 53 sends the platform position, velocity, attitude, heading, and time data to the flight management system 11 through the bus interface 54 and data bus 15.

Referring to FIG. 1, 3, and 4, in step (12), the control board 53 sends the platform velocity, attitude, body acceleration and rotation data to the flight control system 12 through the bus interface 54 and the data bus 15.

Referring to FIG. 1, 3, and 4, in step (13), the control board 53 sends the platform position and time data to the automatic dependent surveillance 13 through the bus interface 54 and the data bus 15.

Referring to FIG. 1, 3, and 4, in step (14), the control board 53 sends the platform position, velocity, and attitude data to the enhanced ground proximity warning system 17 through the bus interface 54 and the data bus 15.

Referring to FIG. 1, 3, and 4, in step (15), the control board 53 sends the platform attitude and body acceleration data to the weather radar 18 through the bus interface 54 and the data bus 15.

Referring to FIG. 1, 3, and 4, in step (16), the control board 53 sends Send the platform position and attitude data to the satellite communication system 19 through the bus interface 54 and the data bus 15.

The first preferred embodiment of the present invention as described above is referred as the universal vehicle navigation and control box using enhanced fully-coupled global positioning system/inertial measurement unit positioning with altitude measurement, where the global positioning system measurements of pseudorange, carrier phase, and Doppler shift with the inertial measurements as well as the altitude measurement are blended in a kalman filter.

The universal vehicle navigation and control box can also be implemented by using the tightly-coupled global positioning system/inertial measurement unit integrated with altitude measurement. This is the second preferred embodiment of the present invention where a kalman filter is used to blend the global positioning system measurements of pseudorange and Doppler shift, the inertial measurements, and the altitude measurement from an altitude measurement device. Different from the first preferred embodiment of the present invention, in this method, the global positioning system satellite signal carrier phase is not employed in integration mechanism.

Referring to FIGS. 1, 2, 3, 4, 5b, 6b, 7, 8, 9, 10, 11, 12, 14, 16, and 17, the second preferred embodiment of the present invention is illustrated, which comprises the steps as follows:

1) Perform GPS processing and receive GPS measurements, including pseudorange, Doppler shift, and time from a global positioning system processor 40, and pass them to the navigation processing board 80.

2) Receive inertial measurements which are body angular rates and specific forces from the inertial measurement unit 20, convert them into digital data of body acceleration and rotation by the IMU interface and preprocessing board 60, and send them to the navigation processing board 80 and the control board 53 through the common bus 55.

3) Receive an altitude measurement from the altitude measurement device 30, convert it to mean sea level (MSL) height in digital data type by the altitude interface and processing board 70, and pass it to the central navigation and control board 80 and the control board 53 through the common bus 55.

4) Perform INS processing using a INS processor 81.

5) Blend the output of the INS processor 81, the altitude measurement, and the GPS measurements in a kalman filter 83.

6) Feed back the output of the kalman filter 83 to the INS processor 81 to correct the INS navigation solution.

7) Output the navigation data which are platform velocity, position, altitude, heading and time from the INS processor 81 to the control board 53 via the common bus 55.

8) Send the platform position, velocity, attitude, heading, and time data to the flight management system 11.

9) Send the platform velocity, attitude, body acceleration and rotation data to the flight control system 12.

10) Send the platform position and time data to the automatic dependent surveillance 13.

11) Send the platform position, velocity, and attitude data to the enhanced ground proximity warning system 17.

12) Send the platform attitude and body acceleration data to the weather radar 18.

13) Send the platform position and attitude data to the satellite communication system 19.

Figure 6B:
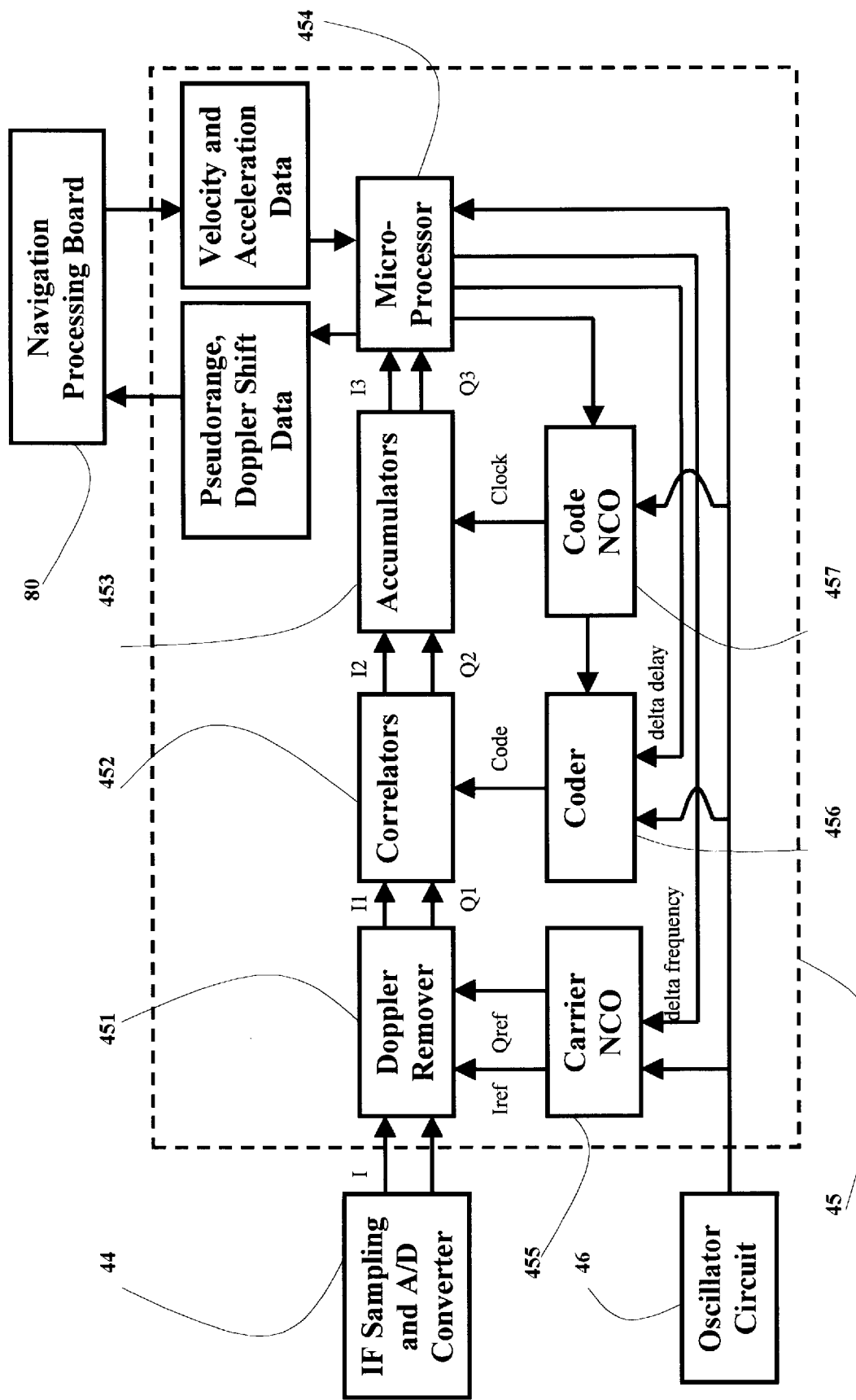
FIG. 6b is a block diagram of the signal processor of the global positioning system processor with external aiding from the navigation processing board according to the second preferred embodiment of the present invention.

After step (6), an additional step can be added:

(6a) Inject velocity and acceleration data from the INS processor 81 into a micro-processor 454 of the global positioning system processor 40 to aid the code tracking of the global positioning system satellite signals, as shown in FIG. 6b.

Figure 5B:
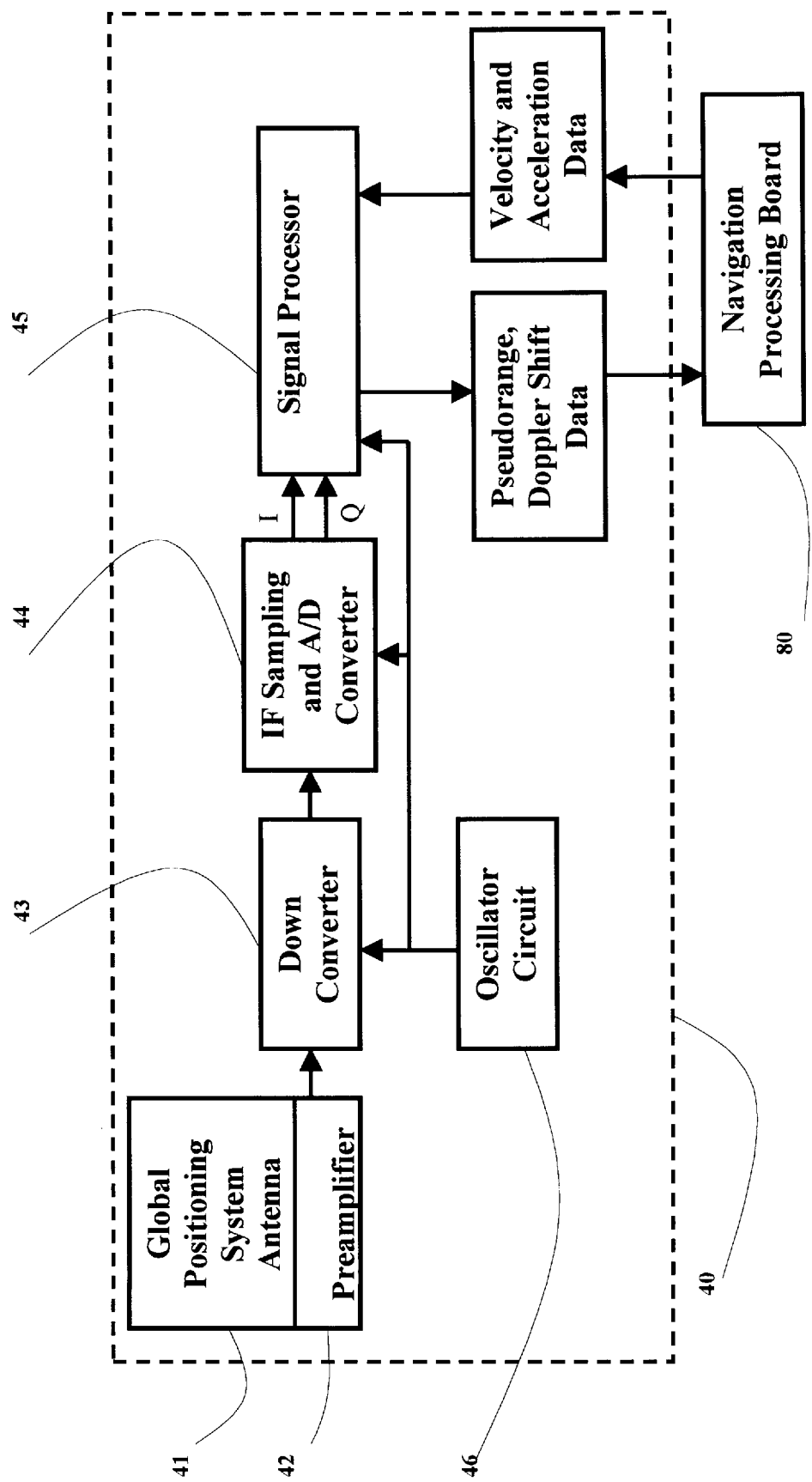
FIG. 5b is a block diagram of the global positioning system processor with external aiding from the navigation processing board according to a second preferred embodiment of the present invention.
Figure 14:
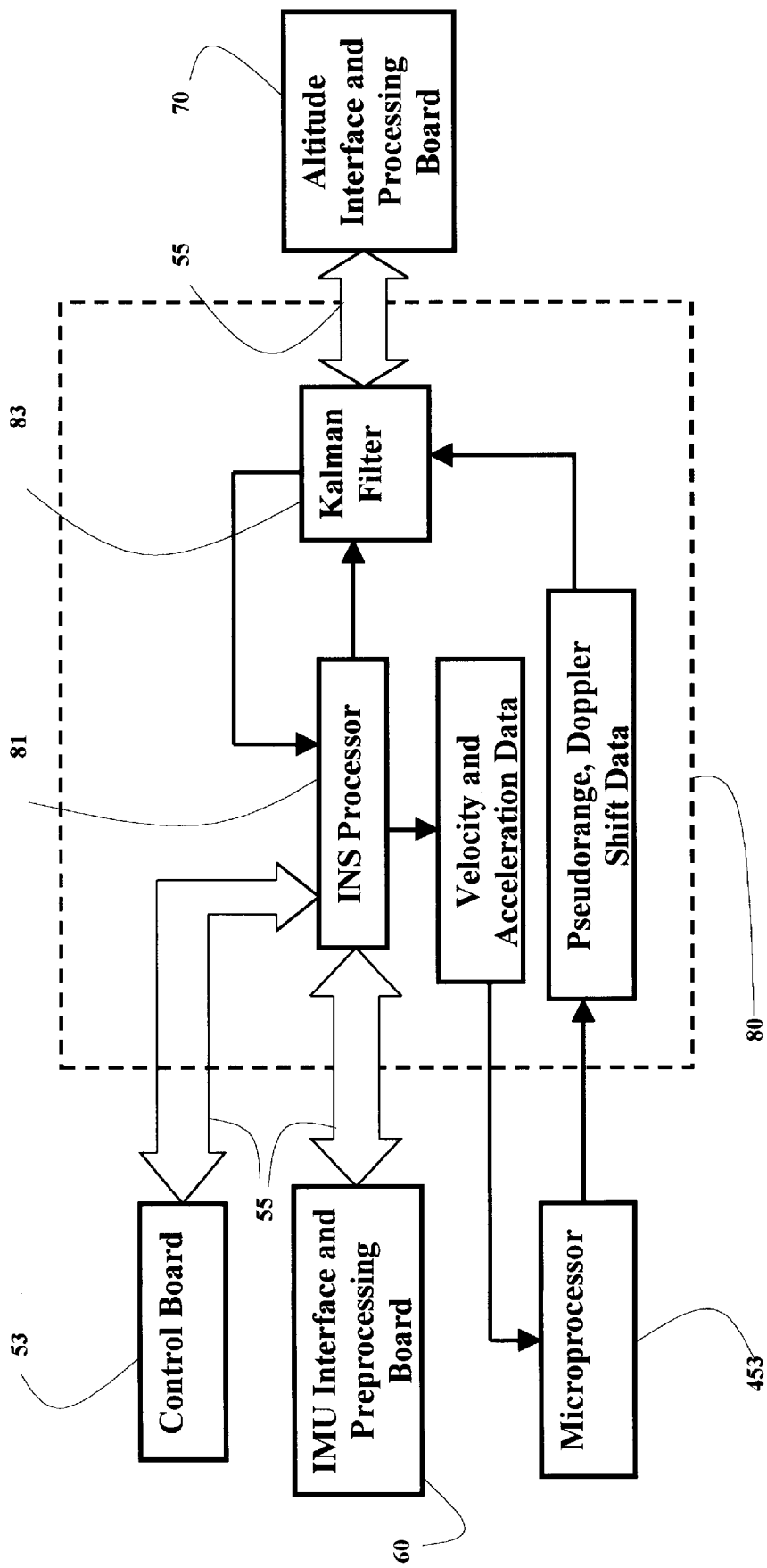
FIG. 14 is a block diagram of the integrated navigation processing of the navigation processing board, including the global positioning system, the inertial sensor, and radar altimeter, according to the above second preferred embodiment of the present invention, illustrating a data fusion module.

Referring to FIGS. 5b, 6b, and 14, in step (1), the second preferred embodiment of the present invention does the same thing as the first preferred embodiment of the present invention except carrier phase tracking and the velocity-acceleration aiding carrier phase tracking. The navigation processing board 80 receives only pseudorange and Doppler shift from the global positioning system processor 40, excluding the measurement of carrier phase.

Referring to FIG. 5b, in step (1), the global positioning system antenna 41, the preamplifier 42, the down converter 43, the IF sampling and A/D converter 44, and the oscillator 46 do the same things as in the first preferred embodiment of the present invention, except the signal processor 45. The signal processor 45 receives the digitized data from the IF sampling and A/D converter 44 to extract the navigation data modulated on the GPS signal, such as the GPS satellite ephemeris, atmosphere parameters, satellite clock parameter, and time information. The signal processor 45 also processes the digital data from the IF sampling and A/D converter 44 to derive the pseudorange and Doppler shift. The extracted pseudorange and Doppler shift are sent to the navigation processing board 80. In step (6a), the signal processor 45 receives the velocity and acceleration from the navigation processing board 80 to perform code tracking aiding.

Referring to FIG. 6b, in step (1), the pseudorange measurements are derived from the GPS code tracking loop which comprises correlators 452, accumulators 453, a micro-processor 454, a code NCO (numerical controlled oscillator) 457, and a coder 456. The Doppler shift are obtained from the GPS satellite signal frequency tracking loop which is different from the carrier phase tracking loop in the first preferred embodiment of the present invention. The frequency tracking loop comprises a Doppler removal 451, correlators 452, accumulators 453, a microprocessor 454, and a carrier NCO (numerical controlled oscillator) 455, where the microprocessor 454 does not perform carrier phase detection.

Referring to FIG. 6b, in step (1), the Doppler remover 451, the correlators 452, the accumulators 453, the carrier NCO 455, the coder 456, and the code NCO 457 function as that in the first preferred embodiment of the present invention. The microprocessor 454 does different work in the second preferred embodiment of the present invention.

Referring to FIG. 6b, in step (1), the accumulations (I3 and Q3) coming from the accumulators 453 are stored and collected by the microprocessor 454, and the accumulators 453 are dumped, resulting in an accumulated-an-dump filtering of the signal components. The microprocessor 454 performs code tracking loop filtering, code acquisition processing, code lock detection, data recovery, and pseudorange and Doppler shift processing. In step (6a), The microprocessor 454 receives the velocity and acceleration information from the navigation processing board 80 to performs external aiding code tracking loop filtering, code acquisition processing, code lock detection, data recovery, and pseudorange and Doppler shift processing.

Referring to FIG. 6b, in step (1), the microprocessor 454 outputs the pseudorange and Doppler shifts to the navigation processing board 80.

Referring to FIG. 14, in step (2), the IMU interface and preprocessing board 60 outputs the inertial measurements of body rates and accelerations to the INS processor 81 of the navigation processing board 80. In step (3), the altitude interface and processing board outputs the altitude measurement to the kalman filter 83 of the navigation processing board 80.

Referring to FIG. 14, in step (5), the microprocessor 454 of the global positioning system processor 40 outputs the pseudorange, Doppler shifts, global positioning system satellite ephemeris, as well as atmosphere parameters to the kalman filter 83 in which the data from the INS processor 81, the altitude interface and processing board 70, and the microprocessor 454 of the global positioning system processor 40 are integrated to derive the position error, velocity error, and attitude error. In step (4), the INS processor 81 processes the inertial measurements, which are body angular rates and accelerations, and the position error, velocity error, and attitude error coming from the kalman filter 83 to derive the corrected navigation solution. The navigation solution includes 3-dimensional position, 3-dimensional velocity, and 3-dimensional attitude. These data are output into the kalman filter 83. On the other hand, in step (7), these data are also passed to the control board 53 via the common bus 55.

Referring to FIG. 16, in step (4), the INS processor 81 in the second preferred embodiment of the present invention functions as that in the first preferred embodiment of the present invention.

Referring to FIG. 17, in step (5), the robust kalman filter in the second preferred embodiment of the present invention works as that in the first preferred embodiment of the present invention except the GPS error compensation module 837 of the kalman filter 83. The GPS error compensation module 837 gathers the GPS raw measurements of pseudorange and Doppler shift, excluding carrier phase, from the global positioning processor 40, and the position and velocity corrections from the updating state vector module 839 to perform GPS error compensation. The corrected GPS raw data of pseudorange and Doppler shift are sent to the preprocessing module 835.

Referring to FIG. 3, the bus interface 55 provides an interface between the universal vehicle navigation and control box and the data bus 15. Referring to FIGS. 1, 3, and 4, in step (8), the control board 53 sends the platform position, velocity, attitude, heading, and time data to the flight management system 11 through the bus interface 54 and data bus 15.

Referring to FIGS. 1, 3, and 4, in step (9), the control board 53 sends the platform velocity, attitude, body acceleration and rotation data to the flight control system 12 through the bus interface 54 and the data bus 15.

Referring to FIGS. 1, 3, and 4, in step (10), the control board 53 sends the platform position and time data to the automatic dependent surveillance 13 through the bus interface 54 and the data bus 15.

Referring to FIGS. 1, 3, and 4, in step (11), the control board 53 sends the platform position, velocity, and attitude data to the enhanced ground proximity warning system 17 through the bus interface 54 and the data bus 15.

Referring to FIGS. 1, 3, and 4, in step (12), the control board 53 sends the platform attitude and body acceleration data to the weather radar 18 through the bus interface 54 and the data bus 15.

Referring to FIGS. 1, 3, and 4, in step (13), the control board 53 sends the platform position and attitude data to the satellite communication system 19 through the bus interface 54 and the data bus 15.

The loosely-coupled integration of global positioning system and inertial navigation system is the simplest integration mode which uses the global positioning system-derived position and velocity as the measurements in a kalman filter. This integration mode does not require a high speed integration processor and a sophisticated global positioning system processor. This leads to its advantage of cost-effectiveness.

The universal vehicle navigation and control box can also be implemented by using the loosely-coupled global positioning system/inertial measurement unit integrated with altitude measurement which leads to the third preferred embodiment of the present invention. The third preferred embodiment of the present invention uses a kalman filter to blend the global positioning system-derive position and velocity, the inertial measurements, and the altitude measurement from an altitude measurement device. Different from the first and second preferred embodiments of the present invention, in this method, the global positioning system satellite signal code tracking and/or carrier phase tracking are not aided by external INS solution. Again, different from the first and second preferred embodiments of the present invention, this method uses the global positioning system-derived position and velocity in the kalman filter, not the pseudorange, Doppler shift, and/or carrier phase.

Referring to FIGS. 1, 2, 3, 4, 5c, 6c, 7, 8, 9, 10, 11, 12, 15, 16, and 17, the third preferred embodiment of the present invention is illustrated, which comprises the steps as follows:

1) Perform GPS processing and receive GPS navigation solution, including position and velocity, and time from a global positioning system processor 80 and pass them to the navigation processing board 80.
2) Receive inertial measurements, including body angular rates and specific forces from an inertial measurement unit 20, convert them into digital data of body acceleration and rotation by the IMU interface and preprocessing board 60, and send them to the navigation processing board 80 and the control board 53 through the common bus 55.
3) Receive an altitude measurement from the altitude measurement device 30, convert it to mean sea level (MSL) height in digital data type by the altitude interface and processing board 70, and pass it to the central navigation and control board 80 and the control board 53 through the common bus 55.
4) Perform INS processing using a INS processor 81.
5) Blend the output of the INS processor 81, the altitude measurement, and the GPS measurements in a kalman filter 83.
6) Feed back the output of the kalman filter 83 to the INS processor 81 to correct the INS navigation solution.
7) Output the navigation data which are platform velocity, position, altitude, heading and time from the INS processor 81 to the control board 53 through the common bus 55.
8) Send the platform position, velocity, attitude, heading, and time data to the flight management system 11.
9) Send the platform velocity, attitude, body acceleration and rotation data to the flight control system 12.
10) Send the platform position and time data to the automatic dependent surveillance 13.
11) Send the platform position, velocity, and attitude data to the enhanced ground proximity warning system 17.
12) Send the platform attitude and body acceleration data to the weather radar 18.
13) Send the platform position and attitude data to the satellite communication system 19.

Figure 5C:
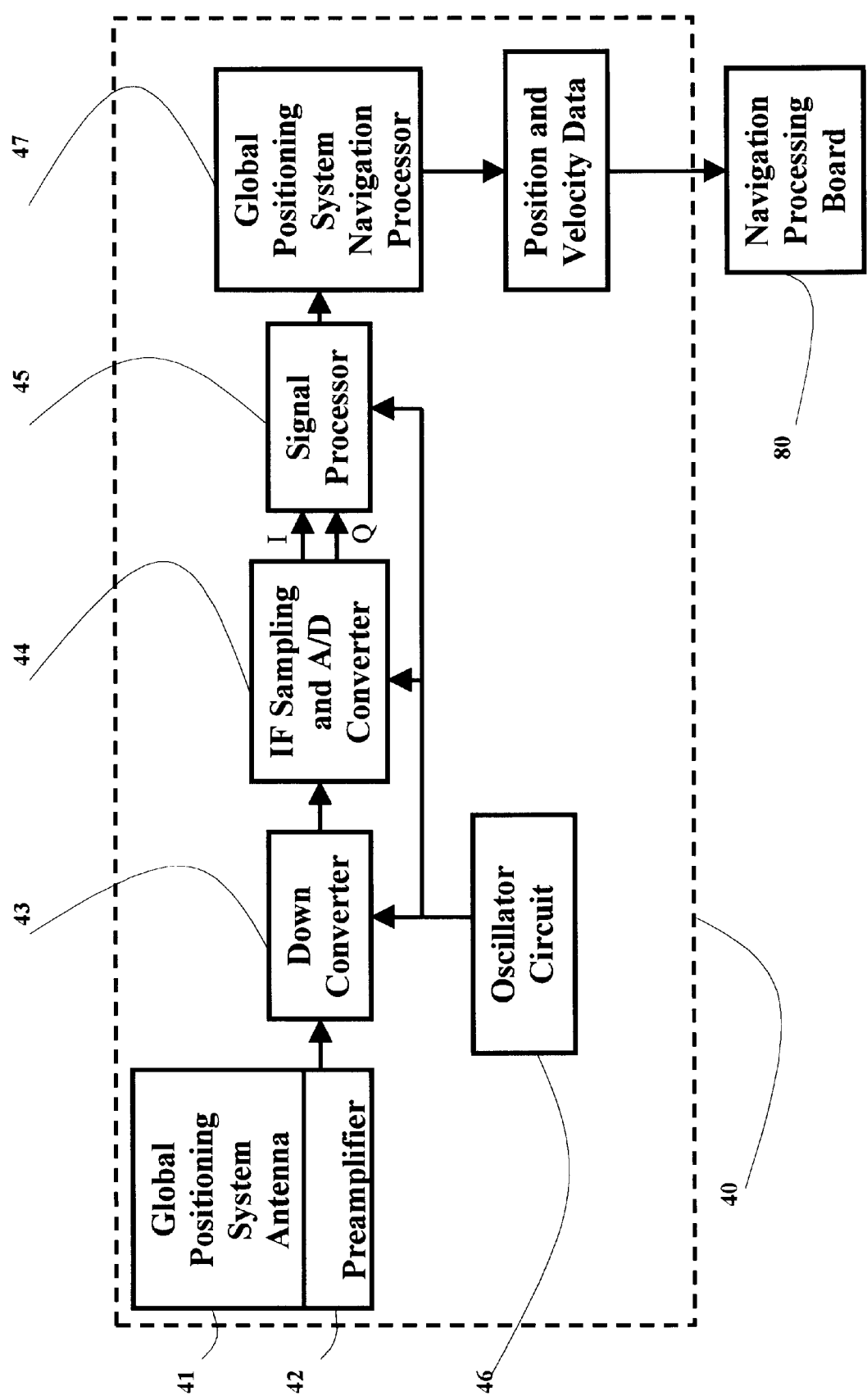
FIG. 5c is a block diagram of the global positioning system processor without external aiding according to a third preferred embodiment of the present invention.

Referring to FIG. 5c, in step (1), the global positioning system antenna 41, the preamplifier 42, the down converter 43, the IF sampling and A/D converter 44, the oscillator circuit 46 do the same things as that in the first and second preferred embodiment of the present invention, except the signal processor 45. The signal processor 45 receives the digitized data from the IF sampling and A/D converter 44 to extract the navigation data modulated on the GPS signal, such as the GPS satellite ephemeris, atmosphere parameters, satellite clock parameter, and time information. The signal processor 45 also processes the digital data from the IF sampling and A/D converter 44 to derive the pseudorange and Doppler shift. The signal processor 45 does not do the velocity and acceleration aiding of code and/or carrier phase tracking.

Referring to FIG. 5c, in step (1), a global positioning system navigation processor 47 is used to calculate the position and velocity of the platform. The global positioning system navigation processor 47 receives the pseudorange and Doppler shift from the signal processor 45 and performs kalman filtering or least square algorithm to derive the position and velocity. The position and velocity are sent to the navigation processing board 80.

Figure 6C:
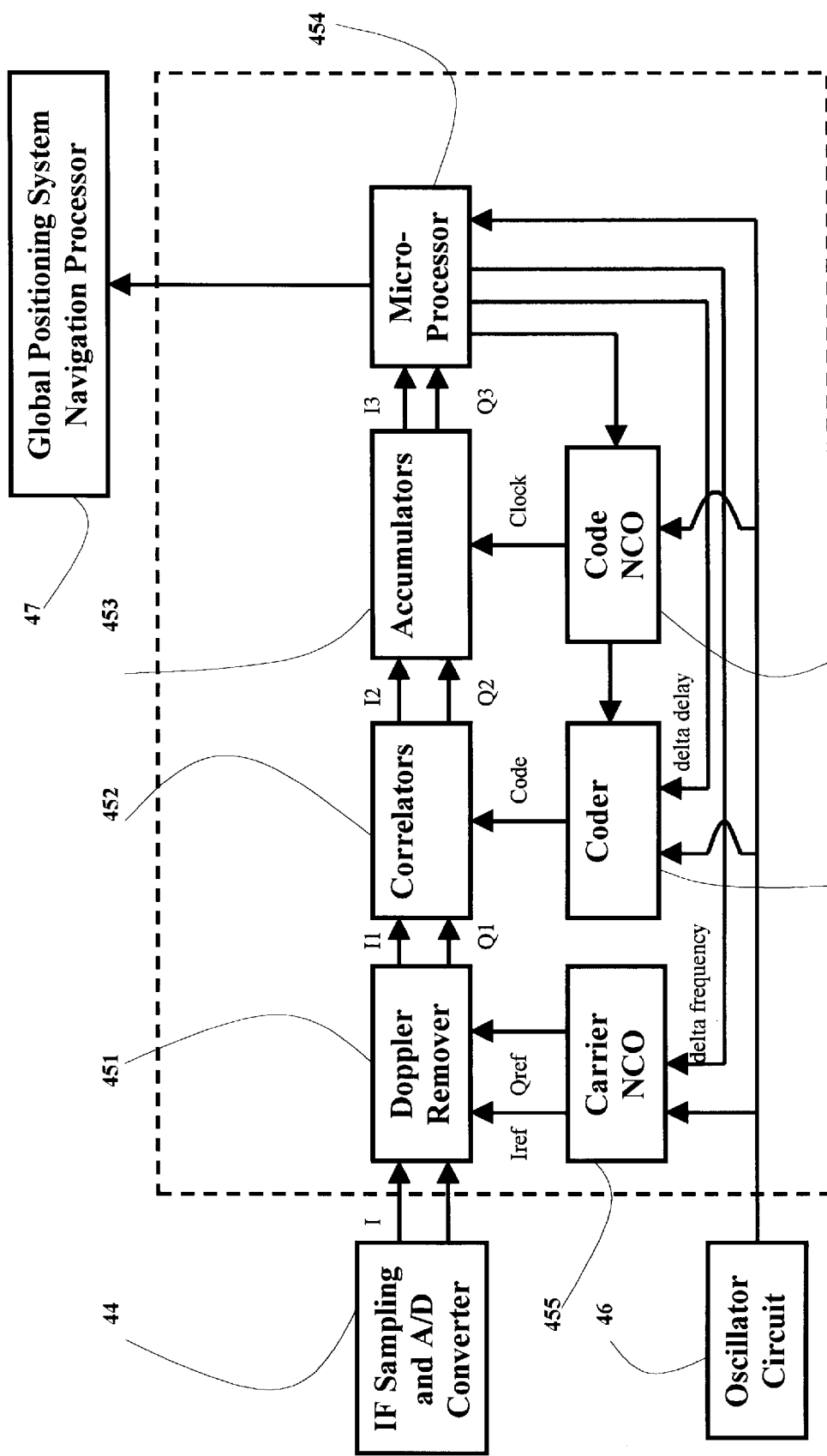
FIG. 6c is a block diagram of the signal processor of the global positioning system processor with external aiding from the navigation processing board according to the third preferred embodiment of the present invention.

Referring to FIG. 6c, in step (1), the pseudorange measurements are derived from the GPS code tracking loop which comprises correlators 452, accumulators 453, a micro-processor 454, a code NCO (numerical controlled oscillator) 457, and a coder 456. The Doppler shift are obtained from the GPS satellite signal frequency tracking loop which is different from the carrier phase tracking loop in the first preferred embodiment of the present invention. The frequency tracking loop comprises a Doppler removal 451, correlators 452, accumulators 453, a microprocessor 454, and a carrier NCO (numerical controlled oscillator) 455, where the microprocessor 454 does not perform carrier phase detection.

Referring to FIG. 6c, in step (1), the Doppler remover 451, the correlators 452, the accumulators 453, the carrier NCO 455, the coder 456, and the code NCO 457 do the same things as that in the first and second preferred embodiment of the present invention. The microprocessor 454 does different work in the third preferred embodiment of the present invention.

Referring to FIG. 6c, in step (1), the accumulations (I3 and Q3) coming from the accumulators 453 are stored and collected by the microprocessor 454, and the accumulators 453 are dumped, resulting in an accumulated-an-dump filtering of the signal components. The microprocessor 454 performs code tracking loop filtering, code acquisition processing, code lock detection, data recovery, and pseudorange and Doppler shift processing. The microprocessor 454 does not receive external velocity and acceleration information to performs external aiding code tracking loop filtering and/or carrier phase tracking loop filtering. The pseudorange and Doppler shift derived from the microprocessor 454 are sent to the global positioning system navigation processor 47.

Referring to FIG. 6c, in step (1), the microprocessor 454 outputs the position and velocity to the navigation processing board 80.

Figure 15:
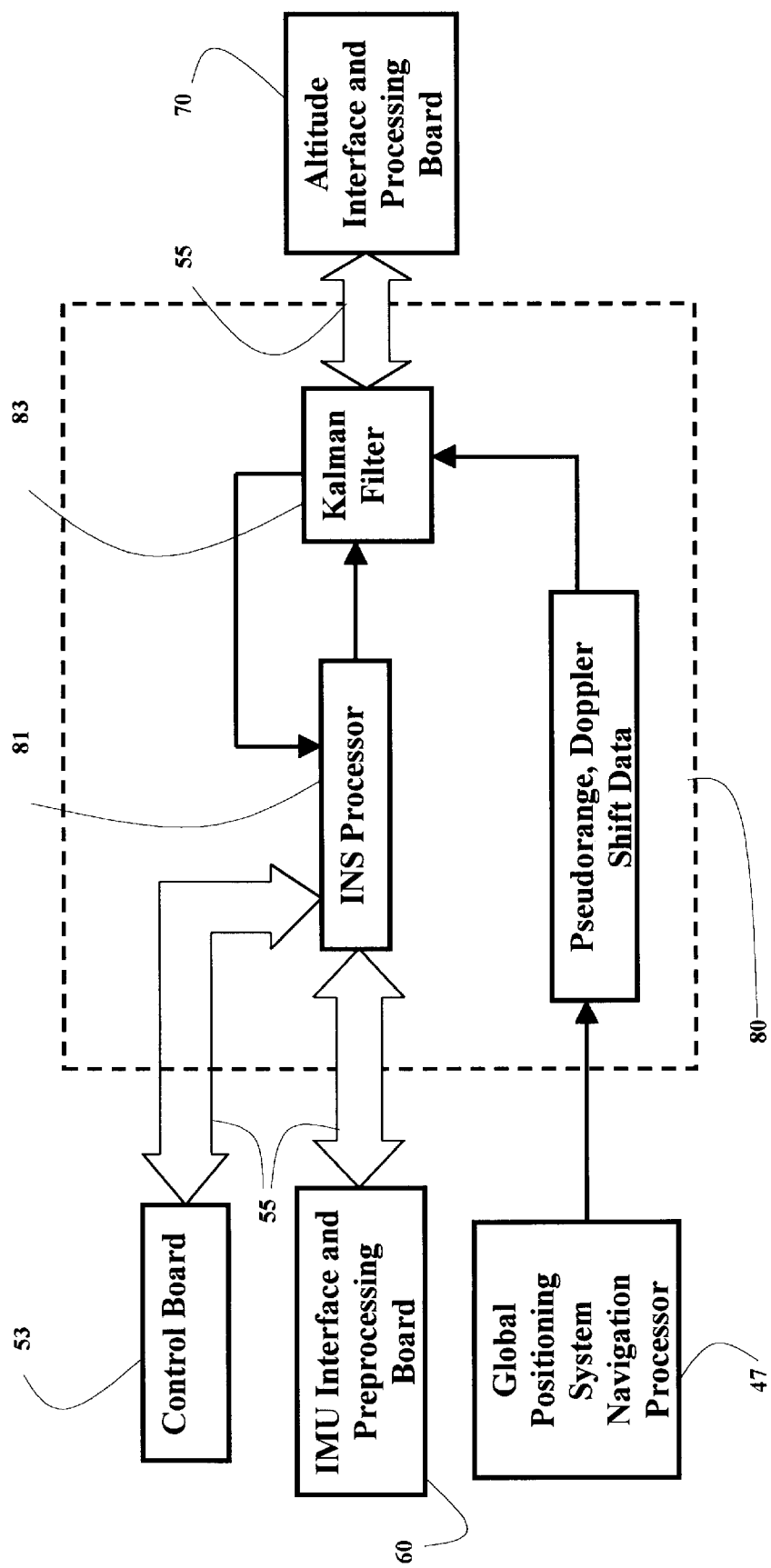
FIG. 15 is a block diagram of the integrated navigation processing of the navigation processing board, including the global positioning system, the inertial sensor, and radar altimeter, according to the above third preferred embodiment of the present invention, illustrating a data fusion module.

Referring to FIG. 15, in step (2), the IMU interface and preprocessing board 60 outputs the inertial measurements of body rates and accelerations to the INS processor 81 of the navigation processing board 80. In step (3), the altitude interface and processing board outputs the altitude measurement to the kalman filter 83 of the navigation processing board 80.

Referring to FIG. 15, in step (5), the global positioning system navigation processor 47 of the global positioning system processor 40 outputs the position and velocity to the kalman filter 83 in which the data from the INS processor 81, the altitude interface and processing board 70, and the microprocessor 454 of the global positioning system processor 40 are integrated to derive the position error, velocity error, and attitude error. In step (4), the INS processor 81 processes the inertial measurements, which are body angular rates and accelerations, and the position error, velocity error, and attitude error coming from the kalman filter 83 to derive the corrected navigation solution. The navigation solution includes 3-dimensional position, 3-dimensional velocity, and 3-dimensional attitude. These data are output into the kalman filter 83. On the other hand, in step (7), these data are also passed to the control board 53 via the common bus 55.

Referring to FIG. 16, in step (4), the INS processor 81 in the third preferred embodiment of the present invention functions as that in the first and second preferred embodiments of the present invention.

Referring to FIG. 17, in step (5), the robust kalman filter in the third preferred embodiment of the present invention functions as that in the first and second preferred embodiments of the present invention except the GPS error compensation module 837 of the kalman filter 83. The GPS error compensation module 837 gathers the GPS-derive position and velocity from the global positioning system navigation processor 47, and the position and velocity corrections from the updating state vector module 839 to perform GPS error compensation. The corrected GPS position and velocity are sent to the preprocessing module 835.

Referring to FIG. 1, 3, and 4, the bus interface 55 provides an interface between the universal vehicle navigation and control box and the data bus 15. In step (8), the control board 53 sends the platform position, velocity, attitude, heading, and time data to the flight management system 11 through the bus interface 54 and data bus 15.

Referring to FIG. 1, 3, and 4, in step (9), the control board 53 sends the platform velocity, attitude, body acceleration and rotation data to the flight control system 12 through the bus interface 54 and the data bus 15.

Referring to FIG. 1, 3, and 4, in step (10), the control board 53 sends the platform position and time data to the automatic dependent surveillance 13 through the bus interface 54 and the data bus 15.

Referring to FIG. 1, 3, and 4, in step (11), the control board 53 sends the platform position, velocity, and attitude data to the enhanced ground proximity warning system 17 through the bus interface 54 and the data bus 15.

Referring to FIG. 1, 3, and 4, in step (12), the control board 53 sends the platform attitude and body acceleration data to the weather radar 18 through the bus interface 54 and the data bus 15.

Referring to FIGS. 1, 3, and 4, in step (13), the control board 53 sends the platform position and attitude data to the satellite communication system 19 through the bus interface 54 and the data bus 15.

What is claimed is:

1. An universal vehicle navigation and control box, comprising:
   an inertial measurement unit (IMU) for providing inertial measurements including body angular rates and specific forces;
   a global positioning system (GPS) processor for providing GPS measurements including pseudorange, carrier phase, and Doppler shift;
   an altitude measurement device for providing vehicle altitude measurement;
   a central navigation and control processor for processing said GPS measurements, said inertial measurements, and said vehicle altitude measurement to derive a navigation solution, which are connected with said GPS processor, said IMU, said altitude measurement device, and a data bus, comprising an IMU interface and preprocessing board, an altitude interface and processing board, a navigation processing board, a shared memory card for storing data, a bus arbiter for monitoring and managing a common bus and a data bus, and a control board for controlling the data stream mutually connected together via said common bus; wherein
   said navigation processing board is connected with said GPS processor and a data bus for receiving said GPS measurements,
   said IMU interface and preprocessing board is connected with said IMU for converting said inertial measurements received from said IMU into digital data of body acceleration and rotation which are sent to said navigation processing board and said control board via said common bus,
   said altitude interface and processing board is connected with said altitude measurement device for converting said altitude measurement received from said altitude measurement device to mean sea level height in digital data type which are passed to said navigation processing board and said control board through said common bus, and
   said bus interface is connected between said control board and said data bus.

2. An universal vehicle navigation and control box, as recited in claim 1, wherein said central navigation and control processor is selectively connected via said data bus to a flight management system, a flight control system, an automatic dependent surveillance, a cockpit display, an enhanced ground proximity warning system, a weather radar, and a satellite communication system.

3. An universal vehicle navigation and control box, as recited in claim 1, wherein said IMU interface and preprocessing board includes an analog signal interface which is a multi-channel A/D converter circuit board for converting analog IMU signals into digital data, which comprises a multi-channel low pass filter connected to the inertial measurement unit, a multi-channel A/D converter circuit connected between the multi-channel low pass filter and the common bus, and a DMA interface connected to the common bus, wherein said analog interface further comprises a timing circuit connected between the multi-channel A/D converter circuit and the DMA interface;
   wherein said analog IMU signals from said IMU are filtered by said multi-channel low pass filter, said filtered analog IMU signals are sent to said multi-channel A/D converter circuit, said timing circuit provides a sampling frequency for said multi-channel A/D converter circuit, said multi-channel A/D converter circuit samples and digitizes said filtered analog IMU signals, said timing circuit also triggers said DMA interface;
   wherein after sampling and digitizing operation of said multi-channel A/D converter circuit, said DMA interface informs said navigation processing board and said control board via said common bus to get IMU data on said common bus;
   wherein after receiving of the DMA signal by said navigation processing board and said control board, said multi-channel A/D converter circuit outputs said digitized IMU data on said common bus.

4. An universal vehicle navigation and control box, as recited in claim 1, wherein said IMU interface and preprocessing board includes a serial signal interface which is a multi-channel RS-485 communication control circuit board for receiving serial IMU data, which comprises an RS-485 interface circuit connected between said IMU and said common bus, and an interrupt circuit connected between said RS-485 interface circuit and said common bus;
   wherein said RS-485 interface circuit receives said serial IMU signal from said IMU;
   wherein once receiving operation is finished, said RS-485 interface circuit informs said interrupt circuit, said interrupt circuit then tells said navigation processing board and said control board via said common bus that said IMU data is ready;
   wherein after receiving interrupt signal from said interrupt interface by said navigation processing board and said control board via said common bus, said RS-485 interface circuit outputs said IMU data on said common bus, wherein said navigation processing board and said control board get said IMU data which are body rates and accelerations from said common bus.

5. An universal vehicle navigation and control box, as recited in claim 1, wherein said IMU interface and preprocessing board includes a pulse signal interface which is a multi-channel frequency/digital converter circuit board for receiving pulse IMU signals, comprising an Inc/Dec pulse separation circuit connected to said IMU, a bus interface circuit and a interrupt circuit connected to said common bus respectively; wherein said multi-channel frequency/digital converter circuit board further comprises a multi-channel frequency/digital circuit connected between said Inc/Dec pulse separation circuit and said bus interface circuit;

wherein said pulse IMU signals are passed to said multi-channel frequency/digital circuit via said Inc/Dec pulse separation circuit from said IMU, wherein said Inc/Dec pulse separation circuit regulates said pulse IMU signals, said multi-channel frequency/digital circuit converts said regulated pulse IMU signals into digital data;

wherein once the conversion is finished, said digital IMU data are passed to said bus interface circuit, wherein said bus interface coverts said digital IMU into common bus compatible digital data and outputs them to said common bus;

wherein said bus interface circuit triggers said interrupt circuit to generate interrupt signal, said interrupt signal informs said navigation processing board and said control board that said IMU data is ready via said common bus.

6. An universal vehicle navigation and control box, as recited in claim 1, wherein said IMU interface and preprocessing board includes a parallel digital signal interface which comprises a bus interface circuit connected between said IMU and said common bus, and an interrupt circuit connected between said bus interface circuit and said common bus;

wherein said parallel IMU signal are received by said bus interface circuit from said IMU and converted into common bus compatible data;

wherein after receiving said parallel IMU data, said bus interface circuit triggers said interrupt circuit to generate interrupt signal which is used to inform said navigation processing board and said control board via said common bus that said IMU data is ready;

wherein said bus interface circuit outputs said IMU data to said common bus, and said navigation processing board and said control board receive said IMU data from said common bus.

7. An universal vehicle navigation and control box, as recited in claim 2, wherein said IMU interface and preprocessing board includes an analog signal interface which is a multi-channel A/D converter circuit board for converting analog IMU signals into digital data, which comprises a multi-channel low pass filter connected to the inertial measurement unit, a multi-channel A/D converter circuit connected between the multi-channel low pass filter and the common bus, and a DMA interface connected to the common bus, wherein said analog interface further comprises a timing circuit connected between the multi-channel A/D converter circuit and the DMA interface;

wherein said analog IMU signals from said IMU are filtered by said multi-channel low pass filter, said filtered analog IMU signals are sent to said multi-channel A/D converter circuit, said timing circuit provides a sampling frequency for said multi-channel A/D converter circuit, said multi-channel A/D converter circuit samples and digitizes said filtered analog IMU signals, said timing circuit also triggers said DMA interface;

wherein after sampling and digitizing operation of said multi-channel A/D converter circuit, said DMA interface informs said navigation processing board and said control board via said common bus to get IMU data on said common bus;

wherein after receiving of the DMA signal by said navigation processing board and said control board, said multi-channel A/D converter circuit outputs said digitized IMU data on said common bus.

8. An universal vehicle navigation and control box, as recited in claim 2, wherein said IMU interface and preprocessing board includes a serial signal interface which is a multi-channel RS-485 communication control circuit board for receiving serial IMU data, which comprises an RS-485 interface circuit connected between said IMU and said common bus, and an interrupt circuit connected between said RS-485 interface circuit and said common bus;

wherein said RS-485 interface circuit receives said serial IMU signal from said IMU;

wherein once receiving operation is finished, said RS-485 interface circuit informs said interrupt circuit, said interrupt circuit then tells said navigation processing board and said control board via said common bus that said IMU data is ready;

wherein after receiving interrupt signal from said interrupt interface by said navigation processing board and said control board via said common bus, said RS-485 interface circuit outputs said IMU data on said common bus, wherein said navigation processing board and said control board get said IMU data which are body rates and accelerations from said common bus.

9. An universal vehicle navigation and control box, as recited in claim 2, wherein said IMU interface and preprocessing board includes a pulse signal interface which is a multi-channel frequency/digital converter circuit board for receiving pulse IMU signals, comprising an Inc/Dec pulse separation circuit connected to said IMU, a bus interface circuit and a interrupt circuit connected to said common bus respectively; wherein said multi-channel frequency/digital converter circuit board further comprises a multi-channel frequency/digital circuit connected between said Inc/Dec pulse separation circuit and said bus interface circuit;

wherein said pulse IMU signals are passed to said multi-channel frequency/digital circuit via said Inc/Dec pulse separation circuit from said IMU, wherein said Inc/Dec pulse separation circuit regulates said pulse IMU signals, said multi-channel frequency/digital circuit converts said regulated pulse IMU signals into digital data;

wherein once the conversion is finished, said digital IMU data are passed to said bus interface circuit, wherein said bus interface coverts said digital IMU into common bus compatible digital data and outputs them to said common bus;

wherein said bus interface circuit triggers said interrupt circuit to generate interrupt signal, said interrupt signal informs said navigation processing board and said control board that said IMU data is ready via said common bus.

10. An universal vehicle navigation and control box, as recited in claim 2,
- wherein said IMU interface and preprocessing board includes a parallel digital signal interface which comprises a bus interface circuit connected between said IMU and said common bus, and an interrupt circuit connected between said bus interface circuit and said common bus;
- wherein said parallel IMU signal are received by said bus interface circuit from said IMU and converted into common bus compatible data;
- wherein after receiving said parallel IMU data, said bus interface circuit triggers said interrupt circuit to generate interrupt signal which is used to inform said navigation processing board and said control board via said common bus that said IMU data is ready;
- wherein said bus interface circuit outputs said IMU data to said common bus, and said navigation processing board and said control board receive said IMU data from said common bus.

11. An universal vehicle navigation and control box, as recited in claim 2, said control board controls and distributes navigation data to other avionics systems;
- wherein said control board receives said body acceleration and rotation data from said IMU interface and preprocessing board, receives said vehicle altitude data from said altitude interface and processing board via said common bus, and receives said vehicle position, velocity, attitude, and time data from said navigation board via said common bus;
- wherein said control board sends vehicle position, velocity, attitude, and time data to said flight management system via said bus interface and said data bus;
- wherein said control board sends said vehicle velocity, attitude, and said digital body acceleration and rotation data to said flight control system via said bus interface and said data bus;
- wherein said control board sends said vehicle position and time data to said automatic dependence surveillance via said bus interface and said data bus;
- wherein said control board sends said vehicle position, velocity, attitude, and time data to said cockpit display via said bus interface and said data bus;
- wherein said control board sends said vehicle position, velocity, and attitude data to said enhanced ground proximity warning system via said bus interface and said data bus;
- wherein said control board sends said vehicle attitude and said body acceleration data to said weather radar via said bus interface and said data bus;
- wherein said control board sends said vehicle position and attitude data to said satellite communication system via said bus interface and said data bus.

12. An universal vehicle navigation and control box, as recited in anyone of claims 1 to 11, wherein said altitude measurement device includes a barometric device and a radar altimeter; wherein said barometric device provides said vehicle altitude above mean sea level (MSL), and said radar altimeter provides said vehicle altitude above terrain.

13. An universal vehicle navigation and control box, as recited in anyone of claims 1 to 11, wherein said altitude interface and processing board includes a barometric device interface for converting measurement of said barometric device into digital data which is said vehicle altitude above mean sea level (MSL);
- said barometric device interface is a multi-channel A/D converter circuit board, which comprises a low pass filter connected to said barometric device, a A/D converter circuit connected between said low pass filter and said common bus, and a DMA interface connected to said common bus; wherein said barometric device interface further comprises a timing circuit connected between said A/D converter circuit and said DMA interface.

14. An universal vehicle navigation and control box, as recited in anyone of claims 1 to 11, wherein said altitude interface and processing board includes a radar altimeter interface for converting measurement of said radar altimeter into said vehicle altitude above MSL;
- wherein said radar altimeter interface comprises a data fusion module connected between said radar altimeter and said common bus, and a terrain database connected between said data fusion module and said common bus;
- wherein said radar altimeter generates said vehicle altitude above terrain;
- wherein said terrain database receives said vehicle position information from said navigation processing board through said common bus, and said database queries a terrain elevation above MSL and output it to said data fusion module;
- wherein said data fusion module combines said vehicle altitude above terrain from said radar altimeter and said terrain elevation from said terrain database to generate said vehicle altitude above MSL.

15. An universal vehicle navigation and control box, as recited in anyone of claims 1 to 11, wherein said navigation processing board comprises an INS processor, a Kalman filter, a carrier phase integer ambiguity resolution module;
- wherein said IMU measurements coming from said IMU interface and preprocessing board are collected by said INS processor to perform inertial navigation processing;
- wherein said vehicle velocity and acceleration data derived by said INS processor are sent to said GPS processor to aid carrier phase and code tracking loops of a microprocessor of said GPS processor;
- wherein said Kalman filter collects said vehicle altitude from said altitude interface and processing board, output of said INS processor, and said GPS measurements which are carrier phase, pseudorange, and Doppler shift from said GPS processor to perform integrated filtering processing to derive position error and attitude error;
- wherein said position error and said attitude error are sent to said INS processor to correct said inertial navigation solution;
- wherein said carrier phase integer ambiguity resolution module receives said corrected inertial navigation solution from said INS processor, said GPS measurements from said GPS processor, and output of said Kalman filter to fix a GPS satellite carrier phase integer ambiguity number;
- wherein said fixed GPS satellite carrier phase integer ambiguity number is sent to said Kalman filter.

16. An universal vehicle navigation and control box, as recited in anyone of claims 1 to 11, wherein said navigation processing board comprises an INS processor, and a Kalman filter;
- wherein said IMU measurements coming from said IMU interface and preprocessing board are collected by said INS processor to perform inertial navigation processing;

wherein said vehicle velocity and acceleration data derived by said INS processor are sent to said GPS processor to aid carrier phase and code tracking loops of a microprocessor of said GPS processor;

wherein said Kalman filter collects said vehicle altitude from said altitude interface and processing board, output of said INS processor, and said GPS measurements which are pseudorange and Doppler shift from said GPS processor to perform integrated filtering processing to derive position error and attitude error;

wherein said position error and said attitude error are sent to said INS processor to correct said inertial navigation solution.

17. An universal vehicle navigation and control box, as recited in anyone of claims 1 to 11, wherein said navigation processing board comprises an INS processor and a Kalman filter;

wherein said IMU measurements coming from said IMU interface and preprocessing board are collected by said INS processor to perform inertial navigation processing;

wherein said Kalman filter collects said vehicle altitude from said altitude interface and processing board, output of said INS processor, and said GPS measurements which pseudorange and Doppler shift from said GPS processor to perform integrated filtering processing to derive position error and attitude error;

wherein said position error and said attitude error are sent to said INS processor to correct said inertial navigation solution.

18. A vehicle positioning and data integrating method, comprising the steps of:

(a) performing GPS processing and receiving GPS measurements, including pseudorange, carrier phase, Doppler shift, and time, from a global positioning system processor, and passing said GPS measurements to a navigation processing board of a central navigation processor;

(b) receiving inertial measurements, including body angular rates and specific forces from an inertial measurement unit, converting said inertial measurements into digital data of body acceleration and rotation by an IMU interface and preprocessing board, and sending said digital data of body acceleration and rotation to said navigation processing board and a control board via a common bus;

(c) receiving an altitude measurement from an altitude measurement device, converting said altitude measurement to a vehicle altitude above mean sea level (MSL) in digital data type by an altitude interface and processing board, and passing said vehicle altitude above mean sea level to said navigation processing board and said control board through said common bus;

(d) performing an INS processing in an INS processor;

(e) blending an output of said INS processor, said altitude measurement, and said GPS measurements in a kalman filter;

(g) feeding back an output of said kalman filter to said INS processor to correct said INS navigation solution;

(h) injecting said velocity and acceleration data from said INS processor into a signal processor of said global positioning system processor to aid code and carrier phase tracking of the global positioning system satellite signals;

(i) injecting said output of the signal processor of said global positioning system processor, said output of said INS processor, said output of said kalman filter into a carrier phase integer ambiguity resolution module to fix a global positioning system satellite signal carrier phase integer ambiguity number;

(j) outputting said carrier phase integer number from said carrier phase integer ambiguity resolution module into said kalman filter to further improve the positioning accuracy; and (k) outputting said navigation data including vehicle velocity, position, altitude, heading and time from said INS processor to said control board through said common bus.

19. A vehicle positioning and data integrating method, as recited in claim 18, after step (k), further comprising the step of:

sending said vehicle position, velocity, attitude, heading, and time data to a flight management system.

20. A vehicle positioning and data integrating method, as recited in claim 18, after step (k), further comprising the step of:

sending said vehicle velocity, attitude, body acceleration and rotation data to a flight control system.

21. A vehicle positioning and data integrating method, as recited in claim 18, after step (k), further comprising the step of:

sending said vehicle position and time data to an automatic dependent surveillance.

22. A vehicle positioning and data integrating method, as recited in claim 18, after step (k), further comprising the step of:

sending said vehicle position, velocity, and attitude data to an enhanced ground proximity warning system.

23. A vehicle positioning and data integrating method, as recited in claim 18, after step (k), further comprising the step of:

sending said vehicle attitude and body acceleration data to a weather radar.

24. A vehicle positioning and data integrating method, as recited in claim 18, after step (k), further comprising the step of:

sending said vehicle platform position and attitude data to said satellite communication system.

25. A vehicle positioning and data integrating method, comprising the steps of:

(a) performing GPS processing and receiving GPS measurements, including pseudorange, Doppler shift, and time, from a global positioning system processor and passing said GPS measurements to a navigation processing board of a central navigation processor;

(b) receiving inertial measurements, including body angular rates and specific forces, from an inertial measurement unit, converting said inertial measurements into digital data of body acceleration and rotation by an IMU interface and preprocessing board, and sending said digital data of body acceleration and rotation to said navigation processing board and a control board via a common bus;

(c) receiving an altitude measurement from an altitude measurement device, converting said altitude measurement to a vehicle altitude above mean sea level (MSL) in digital data type by an altitude interface and processing board, and passing said digital data of vehicle altitude above mean sea level to said navigation processing board and said control board through said common bus;

(d) performing INS processing in an INS processor;

(e) blending an output of said INS processor, said altitude measurement, and said GPS measurements in a kalman filter;

(f) feeding back an output of said kalman filter to said INS processor to correct said INS navigation solution;

(g) injecting said velocity and acceleration data from said INS processor into a signal processor of said global positioning system processor to aid code and carrier phase tracking of the global positioning system satellite signals; and (h) outputting said navigation data including vehicle velocity, position, altitude, heading and time from said INS processor to said control board through said common bus.

26. A vehicle positioning and data integrating method, as recited in claim 25, after step (h), further comprising the step of:

sending said vehicle position, velocity, attitude, heading, and time data to a flight management system.

27. A vehicle positioning and data integrating method, as recited in claim 25, after step (h), further comprising the step of:

sending said vehicle velocity, attitude, body acceleration and rotation data to a flight control system.

28. A vehicle positioning and data integrating method, as recited in claim 25, after step (h), further comprising the step of:

sending said vehicle position and time data to an automatic dependent surveillance.

29. A vehicle positioning and data integrating method, as recited in claim 25, after step (h), further comprising the step of:

sending said vehicle position, velocity, and attitude data to an enhanced ground proximity warning system.

30. A vehicle positioning and data integrating method, as recited in claim 25, after step (h), further comprising the step of:

sending said vehicle attitude and body acceleration data to a weather radar.

31. A vehicle positioning and data integrating method, as recited in claim 25, after step (h), further comprising the step of:

sending said vehicle platform position and attitude data to said satellite communication system.

32. A vehicle positioning and data integrating method, comprising the steps of:

(a) performing GPS processing and receiving GPS measurements, including position, velocity and time, from a global positioning system processor and passing said GPS measurements to a navigation processing board of a central navigation processor;

(b) receiving inertial measurements, including body angular rates and specific forces, from an inertial measurement unit, converting said inertial measurements into digital data of body acceleration and rotation by an IMU interface and preprocessing board, and sending said digital data of body acceleration and rotation to said navigation processing board and a control board via a common bus;

(c) receiving an altitude measurement from an altitude measurement device, converting said altitude measurement to digital data of vehicle altitude above mean sea level (MSL) by an altitude interface and processing board, and passing said digital data of vehicle altitude above mean sea level to said navigation processing board and said control board through said common bus;

(d) performing INS processing in an INS processor;

(e) blending an output of said INS processor, said altitude measurement, and said GPS measurements in a kalman filter;

(f) feeding back an output of said kalman filter to said INS processor to correct said INS navigation solution; and (g) outputting said navigation data, including vehicle velocity, position, altitude, heading and time, from said INS processor to said control board through said common bus.

33. A vehicle positioning and data integrating method, as recited in claim 32, after step (g), further comprising the step of:

sending said vehicle position, velocity, attitude, heading, and time data to a flight management system.

34. A vehicle positioning and data integrating method, as recited in claim 32, after step (g), further comprising the step of:

sending said vehicle velocity, attitude, body acceleration and rotation data to a flight control system.

35. A vehicle positioning and data integrating method, as recited in claim 32, after step (g), further comprising the step of:

sending said vehicle position and time data to an automatic dependent surveillance.

36. A vehicle positioning and data integrating method, as recited in claim 32, after step (g), further comprising the step of:

sending said vehicle position, velocity, and attitude data to an enhanced ground proximity warning system.

37. A vehicle positioning and data integrating method, as recited in claim 32, after step (g), further comprising the step of:

sending said vehicle attitude and body acceleration data to a weather radar.

38. A vehicle positioning and data integrating method, as recited in claim 32, after step (g), further comprising the step of:

sending said vehicle platform position and attitude data to said satellite communication system.

* * * * *